United States Patent
Heilmann et al.

(10) Patent No.: US 8,414,664 B2
(45) Date of Patent: Apr. 9, 2013

(54) ALGAL COAL AND PROCESS FOR PREPARING SAME

(75) Inventors: Steven M. Heilmann, Afton, MN (US); Kenneth J. Valentas, Golden Valley, MN (US); Marc von Keitz, Minneapolis, MN (US); Frederick J. Schendel, Oakdale, MN (US); Paul A. Lefebvre, Saint Paul, MN (US); Michael J. Sadowsky, Roseville, MN (US)

(73) Assignee: HydoChar LLC, Afton, MN (US)

( * ) Notice: Subject to any disclaimer, the term of this patent is extended or adjusted under 35 U.S.C. 154(b) by 203 days.

(21) Appl. No.: 12/715,595

(22) Filed: Mar. 2, 2010

(65) Prior Publication Data

US 2011/0056124 A1 Mar. 10, 2011

Related U.S. Application Data

(60) Provisional application No. 61/156,715, filed on Mar. 2, 2009.

(51) Int. Cl.
*C10L 5/44* (2006.01)
(52) U.S. Cl. ........................................ 44/605
(58) Field of Classification Search ............ 435/41, 435/134; 201/4; 44/605
See application file for complete search history.

(56) References Cited

U.S. PATENT DOCUMENTS

| | | | | |
|---|---|---|---|---|
| 4,632,731 | A | * | 12/1986 | Bodle et al. ........................ 201/4 |
| 5,270,175 | A | * | 12/1993 | Moll ............................... 435/41 |
| 2010/0093046 | A1 | * | 4/2010 | Remmereit et al. ........... 435/134 |

FOREIGN PATENT DOCUMENTS

WO WO2009048875 * 4/2009

OTHER PUBLICATIONS

Titirici, et al., "A Direct Synthesis of Mesoporous Carbons with Bicontinuous Pore Morphology from Crude Plant Material by Hydrothermal Carbonization," Chem. Mater. 2007, 19, pp. 4205-4212.
Bobleter, et al., "The Hydrothermal Degradation of Cellulosic Matter to Sugars and their Fermentative Conversion to Protein," Journal of Applied Polymer Science, 1976, 20, pp. 2083-2093.
Schuhmacher, et al., "Chemical Structure and Properties of Coal XXXVI—Studies on Artificial Coalification," Fuel, 1960, 39(3), pp. 223-234.
Titirici, et al., "Back in the Black: Hydrothermal Carbonization of Plant Material as an Efficient Chemical Process to Treat the CO2 Problem," New Journal of Chemistry, 2007, 31, pp. 787-789.
Tachibana, et al., "Heating Change of Sucrose Solution by Existence of Inorganic Salts," Nippon Kagaku Zasshi, 1948, 69, pp. 81-84.

* cited by examiner

*Primary Examiner* — James Goloboy
*Assistant Examiner* — Chantel Graham
(74) *Attorney, Agent, or Firm* — Hakanson Patent Law PLC; Sten Erik Hakanson

(57) ABSTRACT

Algae-derived synthetic coal and filtrates. The invention described herein provides an algae-derived synthetic coal product and filtrates and process for preparing the same using an improved hydrothermal carbonization process. The synthetic coal product is similar to natural bituminous coal in terms of percent carbon content and energy equivalency while at the same time containing relatively low levels of sulfur and contaminant heavy metals. Unlike natural coal and other fossil fuels, because the carbon of the biomass is formed through photosynthesis, carbon dioxide formed during combustion is a "carbon neutral" event with little or no "new" carbon dioxide being added to the earth's atmosphere. The algae-derived filtrates contain useful constituents.

10 Claims, 17 Drawing Sheets

NATURAL COAL

NATURAL COAL

Fig. 2 CHLAMYDOMONAS

Fig. 3  SYNTHETIC COAL FROM CHLAMYDOMONAS

MIXED ALGAE

Fig. 5  SYNTHETIC COAL FROM MIXED ALGAE

SYNECHOCYSTIS SP.

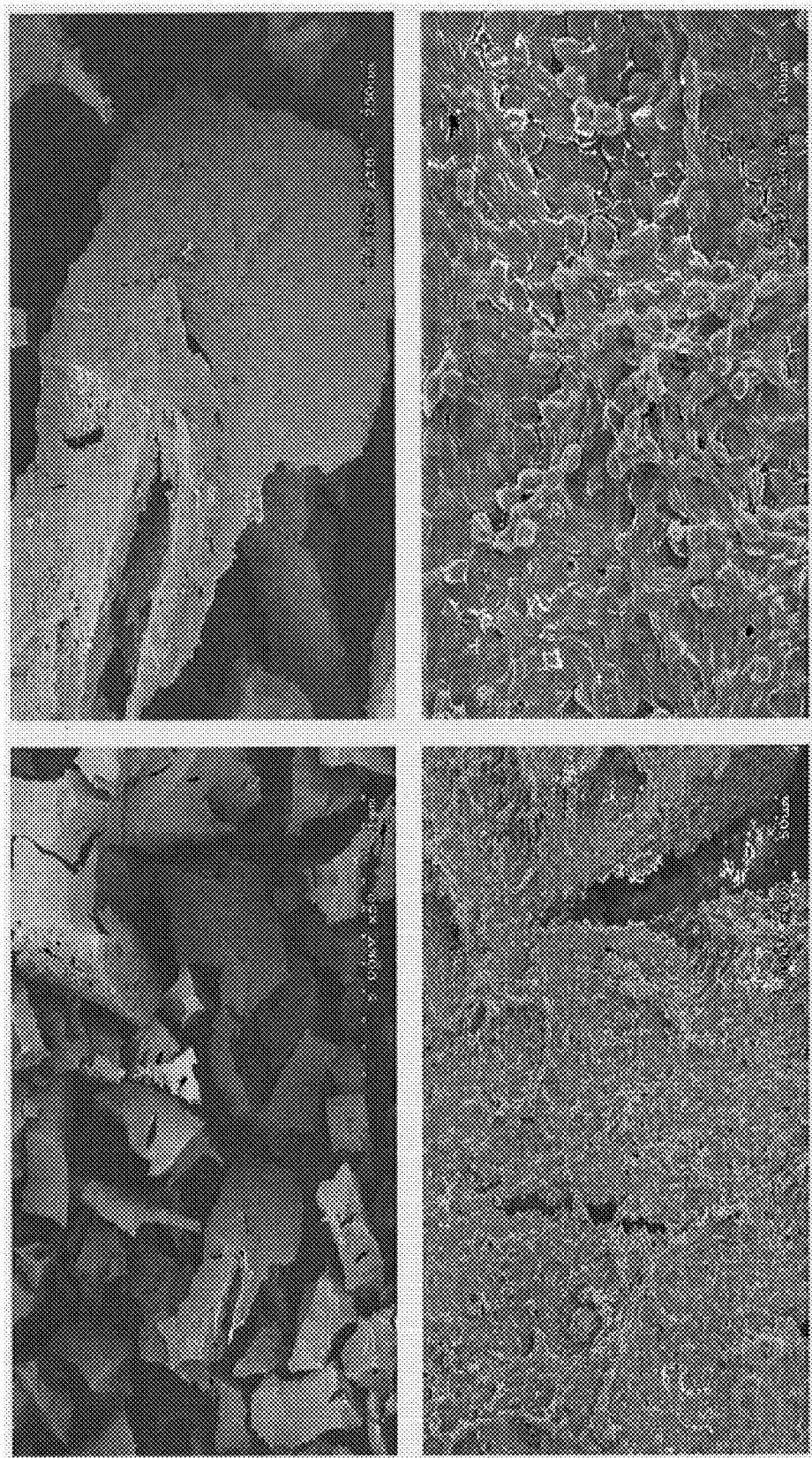
Fig. 7 SYNTHETIC COAL FROM SYNECHOCYSTIS

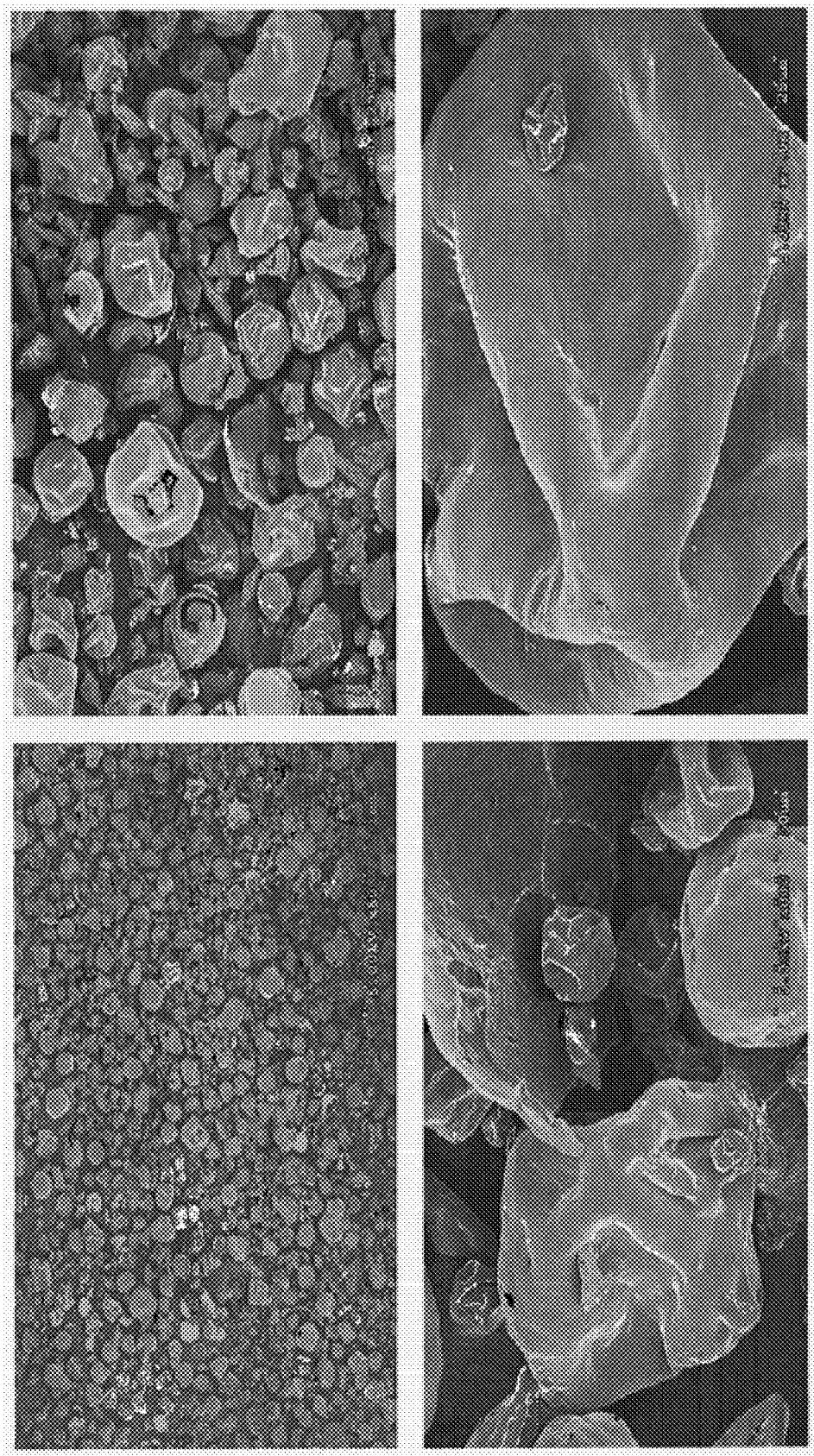
Fig. 8  APHANIZOMEMON FLOS-AQUAE

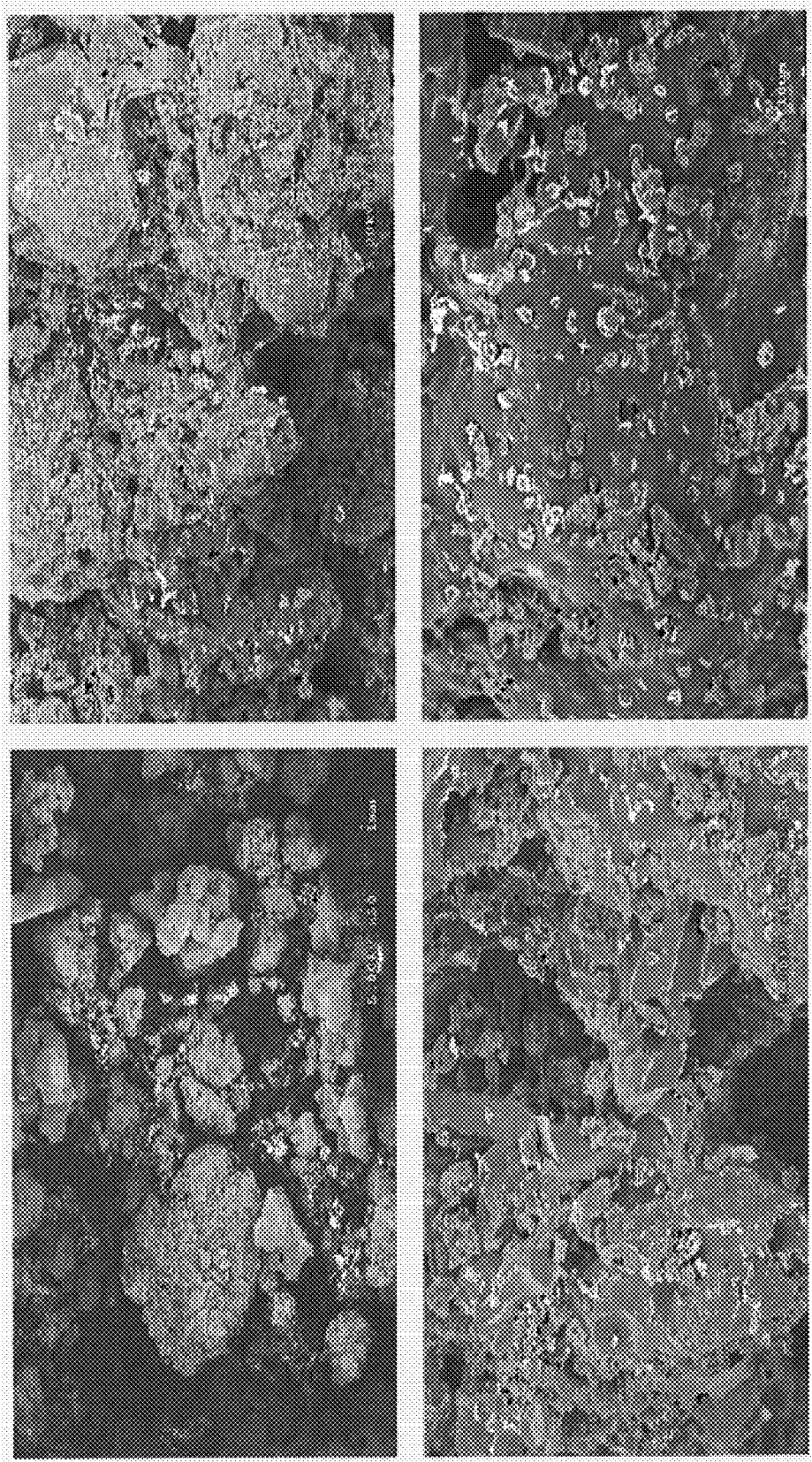
*Fig. 9* SYNTHETIC COAL FROM APHANIZOMEMON FLOS-AQUAE

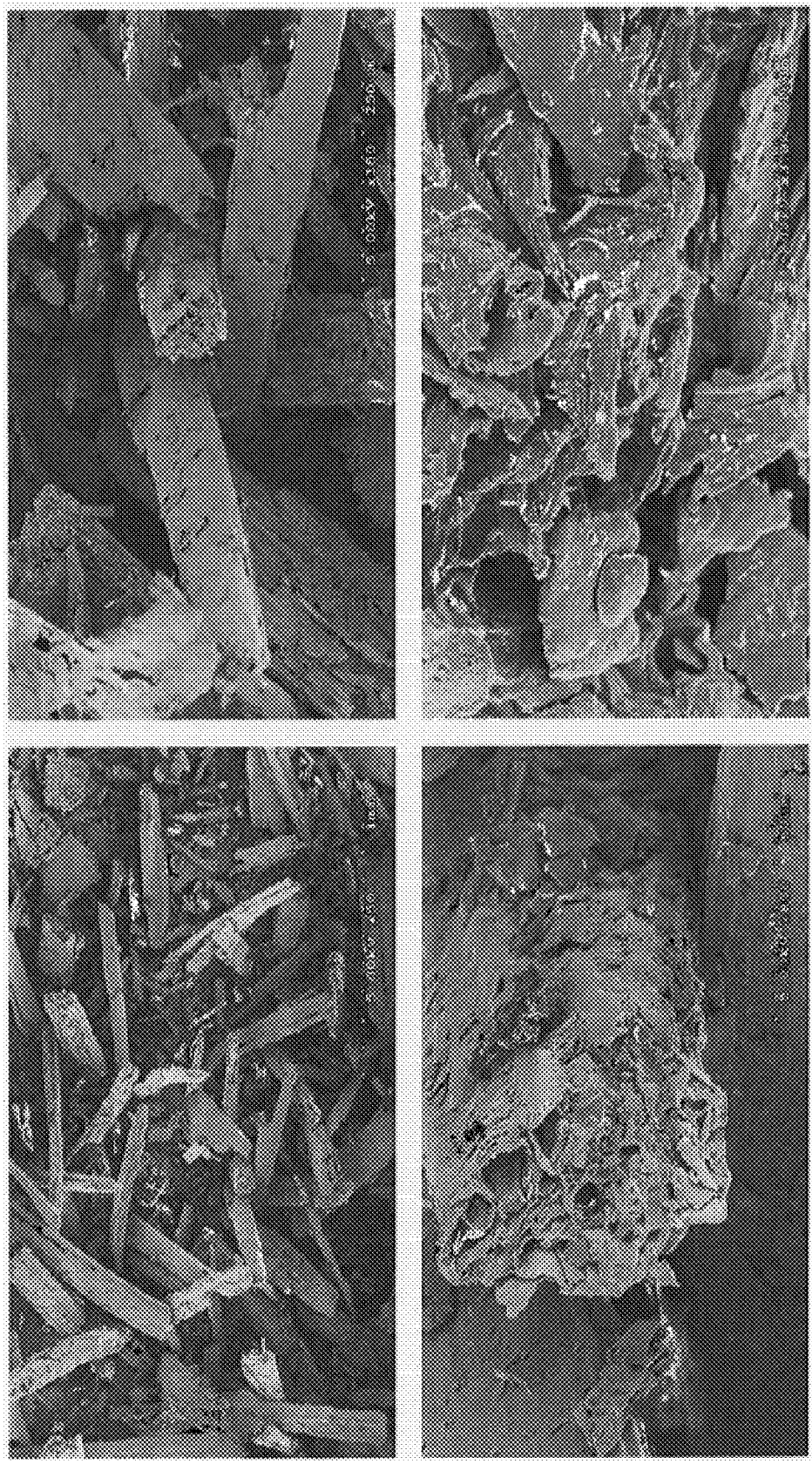
Fig. 10 LITTLE BLUE STEM

Fig. 11 SYNTHETIC COAL FROM LITTLE BLUE STEM

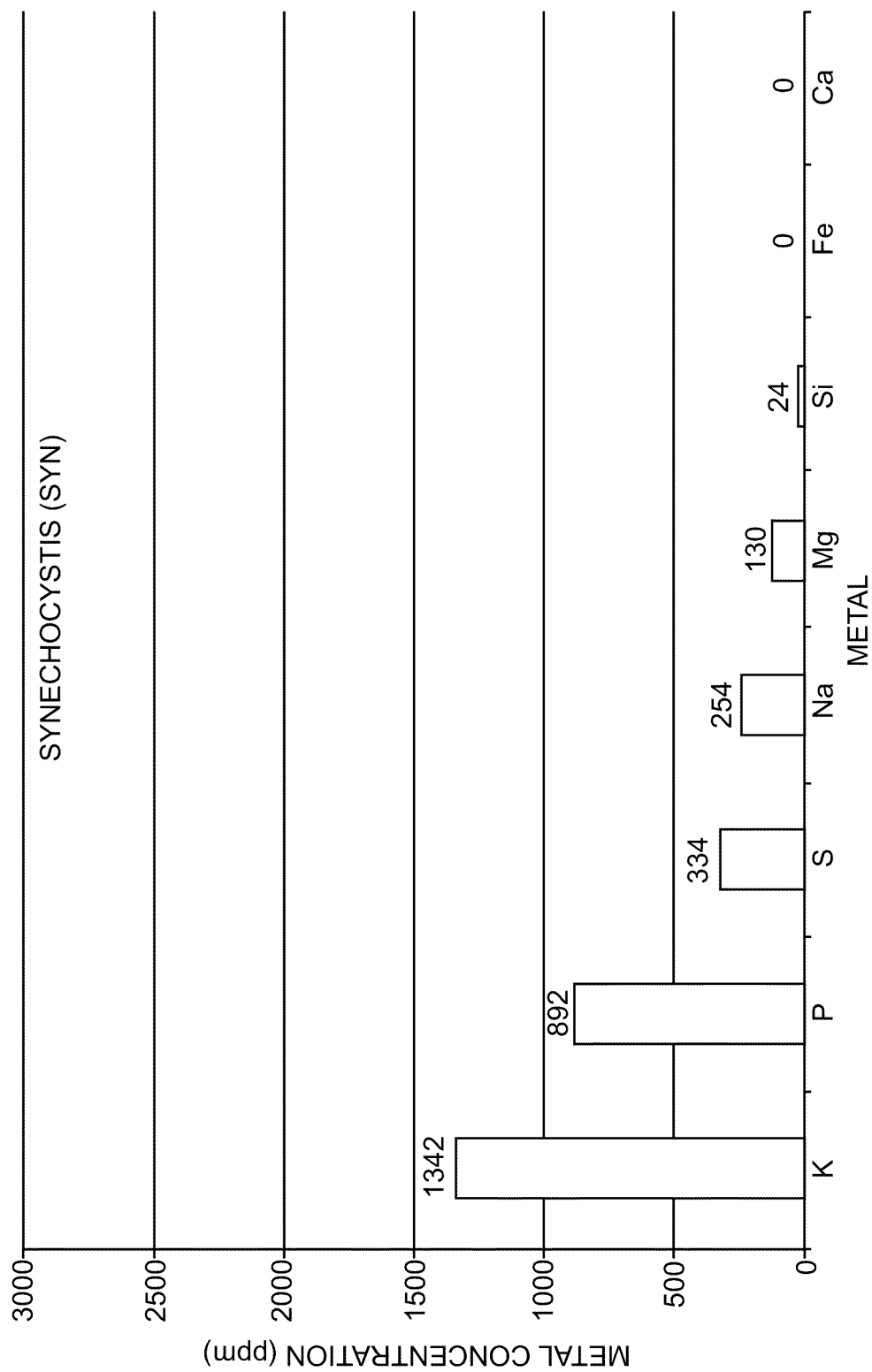

METAL CONTENT (ppm) OF WATER SOLUBLE PRODUCTS FORMED FROM HTC OF LITTLE BLUE STEM

ALGAL COAL AND PROCESS FOR PREPARING SAME

RELATED APPLICATIONS

This application claims priority to U.S. Provisional Application No. 61/156,715, filed Mar. 2, 2009, which is incorporated herein by reference.

BACKGROUND OF THE INVENTION

Natural coal is generally regarded as a non-renewable energy source in part because of the extreme amount of time needed for its formation. For instance, lignite coal requires thousands of years, and anthracite coal requires hundreds of millions of years for their respective formation. The conditions for formation of natural coal are believed to be achieved through sediment of plant and animal materials accumulated, pressurized and heated under increased bed depth.

Rapid oxidation or burning of natural coal releases toxic agents, such as heavy metals (e.g., mercury, uranium) co-deposited as part of the sedimentation formation process. The toxic content of natural coal has been both a significant health concern as well as a global environmental concern. The effect of released carbon dioxide into the atmosphere and its association with global warming present increasing problems associated with the use of natural coal. Increased regulation in the form of emissions controls and carbon emission levels is expected.

Synthetic or artificial coals have been produced from lignocellulosic sources, such as wood and peat. Schuhmacher et al., *Fuel,* 39(3) pp. 223-234 (1960) describes a process involving heating lignocellulosic material in water at temperatures between 225° C. and 390° C. generally under alkaline conditions to prepare artificial coal-like products. According to this process, gaseous by-products include carbon dioxide and the residue ("artificial coal") obtained in decreasing yield with increasing temperature. Woody (lignocellulosic) and higher plants contain many kinds of cells with specific functions. Cellulosic, hemicellulose and lignin are products of specialized cells that provide structural stability and mechanical strength allowing for passage of water and nutrients throughout the various parts of the plant.

When compared on a per unit of mass basis, algae are known to be among the most photosynthetically efficient of all plants. Algae have even been employed as an "active scrubber" with sunlight to remove carbon dioxide via photosynthesis from industrial, carbon-dioxide waste streams associated with coal burning for electricity generation, as well as fermentation for fuel ethanol production. Microalgae are non-lignocellulosic single celled microorganisms composed of proteins, lipids, nucleic acids and carbohydrates.

Hydrothermal carbonization is a thermal decomposition process involving processing biomass in an aqueous system at moderate temperature and pressure for a period of time. The possibility of producing coal using algae and a hydrothermal carbonization process has been hypothesized in an abstract by company AlgoDyne Ethanol (Dec. 20, 2006). However, to Applicants' knowledge, a hydrothermal carbonization process has not previously been developed for the production of synthetic coal from algae or cyanobacteria nor has such a synthetic coal previously been produced. Thus, there exists a need in the energy resource field for algae-derived synthetic coal products, related by-products and processes for their production. There further exists a need for innovative processes utilizing natural biological materials as carbon neutral energy resources.

SUMMARY OF THE INVENTION

Provided are synthetic coal or char made from algae and methods of processing algae to form the synthetic coal or char. In an embodiment of the invention, an algae-derived synthetic coal product is provided. The synthetic coal product is made through hydrothermal carbonization. An algae-derived filtrate formed as a by-product of hydrothermal carbonization of algal material is also provided.

In another embodiment of the invention, the algae-derived synthetic coal product of this embodiment has an organized microstructure, higher hydrogen and higher nitrogen contents as compared to bituminous and synthetic lignocellulosic coals; low or undetectable amounts of elemental sulfur and/or heavy metal contents; low ash content; and an equivalent or greater heat of combustion as compared to synthetic lignocellulosic coal and equivalent heat of combustion to bituminous coal.

In some embodiments, the hydrogen content (% H) in the coal of the invention is at least 40% higher than and the nitrogen content is at least 500% higher than the content of these elements in natural coal. Sulfur content can be less than 0.5%, and heavy metals, present in ppm amounts, include environmentally benign iron. Ash contents are generally no greater than that of bituminous coal, which is between about 5-6%. Even lower ash contents can be obtained with the invention, e.g., <4%, <3%, <1.0%, <0.5%, even 0.3%. Also, in some embodiments, the synthetic coal can have a heat of combustion greater than that obtained with lignocellulosic synthetic coal. Thus, some synthetical coal according to the invention can have a heat of combustion of about 10,500 BTU/lb or greater.

In another embodiment of the invention, a process for preparing an algae-derived synthetic coal product is provided. The process of this embodiment comprises the following steps of: providing a starting alga material comprising a concentrated algae-containing aqueous composition; subjecting said starting material to hydrothermal carbonization to produce solid materials; filtering the resulting solid materials to separate the composition into said solid material and an aqueous filtrate, the separated solid material being the algae-derived synthetic coal; and separately collecting the algae-derived synthetic coal and the filtrate.

In another embodiment, a process of the invention may further include a preliminary algae concentrating step or a preliminary step of removing water from an algae sample to increase the concentration of algae in water for the starting material. The concentration of algae-containing aqueous composition may be from between about 2% to about 40% on a weight basis in some embodiments.

In some embodiments of a process of the invention, the process may further include one or more of the following steps: adding an acidic buffer or a catalyst to a concentrated algae-containing aqueous composition prior to the hydrothermal carbonization step, collecting of the aqueous filtrate; reusing or recirculating the filtrate for use in subsequent hydrothermal carbonization steps; collecting and routing the filtrate for further process or refinement for alternative uses or for formation of other useful products, the filtrate being an algae-derived filtrate.

The hydrothermal carbonization process is typically performed using a temperature ranging from between about 170°

C. and about 225° C., for a duration ranging from a period of about 0.5 hour to about 6 hours, and a pressure up to about 350 psi.

In yet another embodiment, an algae-derived synthetic coal product is provided having some or all of the characteristics previously described above, wherein the algae-derived synthetic coal product is prepared by a process comprising the steps of: providing a starting alga material comprising a concentrated algae-containing aqueous composition; subjecting said starting material to hydrothermal carbonization to produce solid materials; filtering the resulting solid materials to separate the composition into said solid materials and an aqueous filtrate, the separated solid material being the algae-derived synthetic coal; and separately collecting the algae-derived synthetic coal and the filtrate. The filtrate product of this embodiment may be prepared with any of the aforementioned additional process steps.

Any of a variety of algal materials may be utilized in the processes of the invention to form algal coal or char, including, but not limited to, eukaryotic microalgae and prokaryotic cyanobacteria. In some embodiments, the algal material is: a) eukaryotic microalgae selected from *Scenedesmus, Chlamydomonas, Dunaliella, Chlorella,* and *Nannochloropsis,* b) prokaryotic cyanobacteria selected from *Aphanizomenon, Spirulina, Synechocystis,* and *Synechococcus,* and c) combinations thereof.

Furthermore, the invention provides methods of using the algae-derived synthetic coal prepared in accordance with the invention as an energy resource comprising employing said algae-derived synthetic coal product as a carbon source within a combustive thermal energy generation system. In yet another method, the algae-derived coal product of the invention can be used in a coal gasification process. In one embodiment, the coal product of the invention can be used in a coal gasification process for preparing syngas.

In some embodiments of the invention, the employment of algae as a starting material to produce synthetic coal in the process of the invention provides a carbon neutral energy source with reduced environmental impact. In some other embodiments of the invention, the filtrate is itself a product of the invention; and in yet others, the filtrate may be processed into useful by-products. In yet other embodiments of the process of the invention, the gaseous output is significantly reduced or the generation of gaseous output minimized. This is especially the case for carbon dioxide output, since hydrothermal carbonization is conducted under reaction conditions that increase carbon-to-oxygen ratio primarily by loss of water (dehydration) rather than by loss of carbon dioxide. Some embodiments of the invention may also result in a relatively low toxicity, e.g., a low or undetectable sulfur content or undetectable mercury and uranium content. Also a product with higher hydrogen content than natural bituminous coal may also be provided by some embodiments of the invention.

The invention in its various embodiment will be understood and will become more apparent from the following disclosure.

BRIEF DESCRIPTION OF THE DRAWINGS

The invention is further illustrated by the following drawings—none of which is intended to be construed as necessarily limiting the invention.

FIG. 7 is a series of SEMS of synthetic coal sample corresponding to FIG. 6 starting material *Synechocystis* sp. (a cyanobacterium) at 50×, 180×, 1800× and 3000× magnification employing an accelerated voltage of 5000 volts.

FIG. 8 is a series of SEMs of starting material *Aphanizomenon flos-aquae* (a cyanobacterium) at 50×, 180×, 800×, and 1800× magnification.

FIG. 9 is a series of SEMs of a synthetic coal product prepared from the starting material *Aphanizomenon flos-aquae* (a cyanobacterium) at 50×, 800×, 1800×, and 3000× magnification corresponding to FIG. 8 prepared by hydrothermal carbonization process.

FIG. 10 is a series of SEMs of a lignocellulosic starting material prairie grass identified as *Schizachyrium scoparium* ("Little Bluestem") at 50×, 180×, 800× and 3000× magnification.

FIG. 11 is a series of SEMs of a sample of a synthetic coal product prepared using lignocellulosic starting material prairie grass identified as *Schizachyrium scoparium* ("Little Bluestem") at 50×, 180×, 1800× and 3000× magnification and hydrothermal carbonization process.

FIGS. 12A, 12B, 12C and 12D are a collection of four bar graphs showing the metallic content of >1 ppm in the aqueous filtrates created in hydrothermal carbonization reactions of starting material *Chlamydomonas reinhardtii* (Example 24 and FIG. 12A), the Minnesota lake mixed algae sample (Example 18 and FIG. 12B), *Synechocystis* sp. (Example 17 and FIG. 12C) and *Aphanizomenon flos-aquae* (AFP) (Example 16 and FIG. 12D).

DETAILED DESCRIPTION OF THE INVENTION

Figure 1:
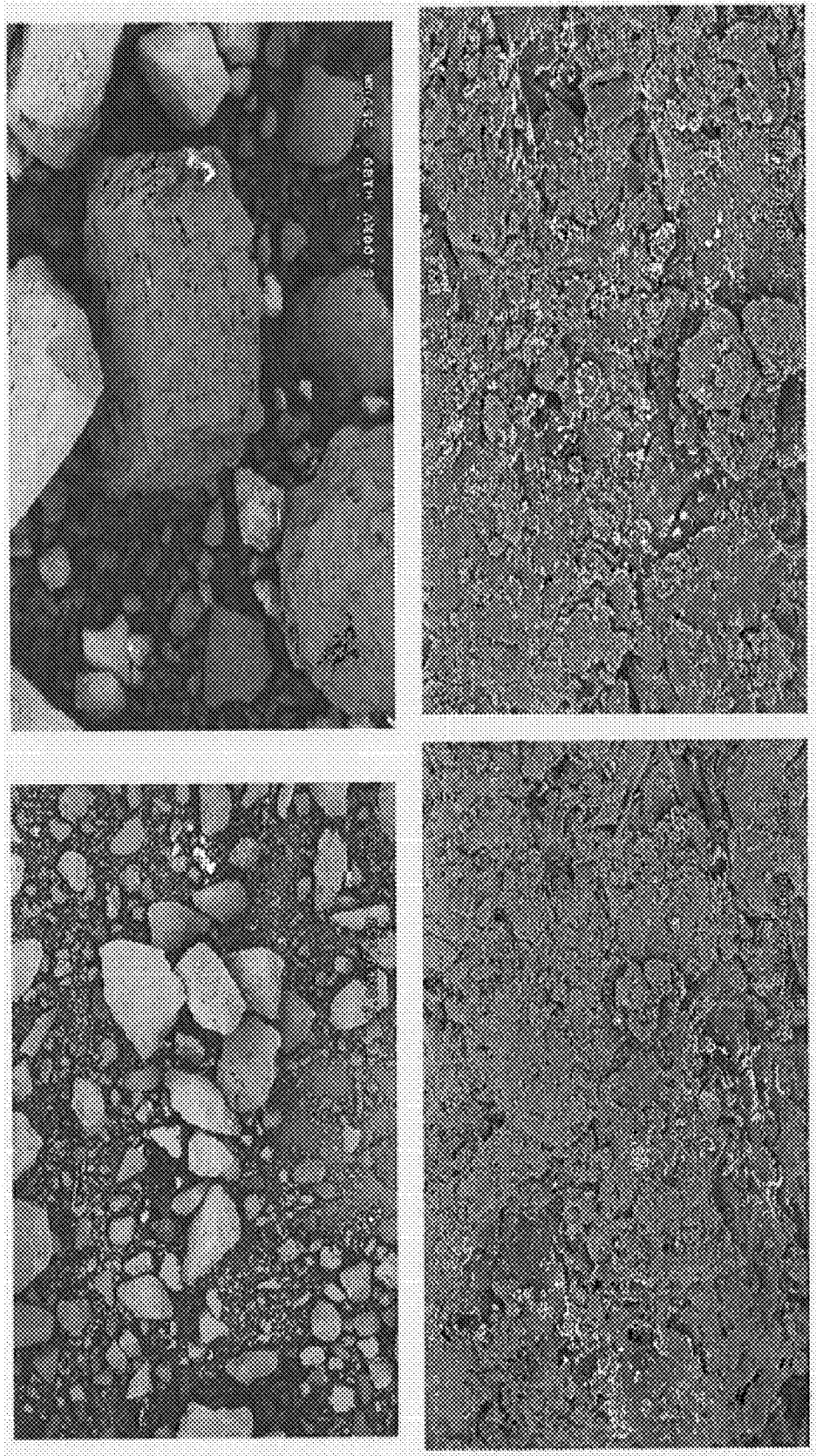
FIG. 1 is a series of scanning electron micrographs (SEMS) at 50×, 180×, 800× and 1800× magnification employing an accelerated voltage of 5000 volts of a natural coal sample in Example 28.

The invention provides a coal-like product (herein after referred to interchangeably as "coal," or "coal product" or "char" similar to natural bituminous coal in terms of percent carbon content and relative energy equivalency while at the same time containing relatively low levels of sulfur and contaminant heavy metals. The terms "coal" or "char" or "coal-product" as used within the context of the synthetic or artificial output product of the invention, are meant to refer to the solid or semi-solid state product outcome corresponding to the algal starting material input and the hydrothermal carbonization process of the invention. The term is not meant to necessarily indicate exclusive employment of the coal product as an ignited energy source; although in some embodiments of the invention, the coal product may be utilized as such a source.

As used herein, the terms "algae," "algal" and "algal species" are meant to refer to both naturally occurring and genetically engineered simple unicellular organisms containing chlorophyll, having photosynthetic activity and residing in aquatic and moist terrestrial habitats and environments, including such unicellular organisms whether grown in a photobioreactor or in ponds or otherwise cultivated. The terms can include living or dead microalgae from eukaryotic organisms such as green "microalgae." The terms as used herein may also refer to photosynthetic prokaryotic organisms such as cyanobacteria. The term "microalgae" is meant to refer to microscopic algae, typically found in both fresh and salt water systems. Diatoms which contain a preponderance of silica are not particularly useful. A non-exhaustive listing of useful microalgae, which is incorporated herein by reference, can be found at http://en.wikipedia.org/wiki/SERI_microalgae_culture_collection.

The phrase "algae-derived" and "alga-derived," when used to define the synthetic coal product within the context of the invention, are meant to refer to the fact that the synthetic coal product was prepared according to process of the invention utilizing an algal source or cyanobacterial source as the starting material or biomass feedstock. Algae is a feedstock that has a substantially or predominantly non-lignocellulosic content.

The term "carbon neutral," as used herein refers to the achievement of nearly net zero carbon emissions by balancing a measured amount of carbon released during oxidation or combustion of biomass with an equivalent amount sequestered during its production. In contrast, combustion of fossil fuels such as petroleum and coal that have been stored carbon sources below the surface of the earth for very long times results in "carbon positive" emissions in which the carbon dioxide created is "new" to the earth's atmosphere.

As used herein, the term "comprising" means the elements recited, or their equivalent in structure or function, plus any other element(s) which are not recited. The terms "having" and "including" are also to be construed as open ended unless the context suggests otherwise. Terms such as "about", "generally", "substantially" and the like are to be construed as modifying a term or value such that it is not an absolute, but does not read on the prior art. Such terms will be defined by the circumstances and the terms that they modify are understood by those of skill in the art. This includes at the very least the degree of expected experimental error, technique error, and instrument error for a given technique used to measure a value.

The synthetic coal of the invention can be prepared by an improved hydrothermal carbonization transformation process using algae as a starting material. Algal coal may be utilized as a substitute or a supplement in the combustion of coal or other combustibles. In contrast to combusting natural fossil coal, the carbon dioxide released during the combustion of the algal coal can be considered "carbon neutral" since all the carbon in the algal coal is derived from carbon dioxide which was recently assimilated by the photosynthetic activity of the algae used to make the algal coal. Thus, some embodiments of the invention can also be used to sequester carbon for storage. Additionally, some embodiments of the coal product of the invention can also be utilized as a soil additive to improve moisture retention and provide nutrients for plant growth. Further, some embodiments of a coal product of the invention may also be useful for the production of synthesis gas to manufacture industrial chemicals such as methanol, acetic acid and ethylene glycol, as well as preparing hydrocarbon fuels via Fischer Tropsch processing. Further still, a by-product of some embodiments of a process of the invention is an aqueous filtrate that can be used as a nutrient for algal growth, as a fertilizer for terrestrial plants, or processed to provide other useful products.

The resultant properties and characteristics of algal coal according to the invention may in part be associated with or a function of the selection of the particular algae or algae mixtures to be employed as a starting material in the process of the invention. Furthermore, the qualitative aspects of the starting algae can affect the qualitative and/or quantitative attributes of the output solid or semi-solid product, i.e., the "coal," as well as the composition of the aqueous products, i.e., aqueous filtrate. Put another way, different algal species (having differing compositions, including cell wall composition), and different combinations of species, affect yield and quality of the synthetic coal of the invention as well as aqueous filtrate products. Thus, a variety of algae and algae mixtures may be used in the processes of the invention. Suitable algae include, but are not limited to, eukaryotic microalgae and prokaryotic cyanobacteria. Examples of such suitable algae include, but are not limited to, eukaryotic microalgae genera *Chlamydomonas, Nannochloropsis, Dunaliella* and *Chlorella*, and prokaryotic cyanobatrium genera *Aphanizomenon, Spirulina, Synechocystis*, and *Synechococcus*. Combinations of different algal genera, species within a single genus, or combinations of both, can also be used in conjunction with the invention. Particularly, good yields of synthetic coal products have been obtained employing as a starting material algae of the genera *Chlamydomonas, Chlorella, Nannochloropsis* and *Dunaliella*.

The process of the invention utilizes the nature and mass ratios of the components of algae in hydrothermal carbonization to advantageously "customize" particular input materials, process parameters and conditions, and resultant output product (i.e., synthetic coal and filtrate). The following table lists some of the component differences between certain species of algae.

TABLE 1

Algae Species and Percent Content

| Algae strain | Proteins (% weight) | Carbohydrates (% weight) | Lipids (% weight) | Nucleic acids (% weight) |
|---|---|---|---|---|
| *Scenedesmus obliquus* | 50-56 | 10-17 | 12-14 | 3-6 |
| *Scenedesmus dimorphus* | 8-18 | 21-52 | 16-40 | — |
| *Chlamydomonas reinhardtii* | 48 | 17 | 21 | — |

TABLE 1-continued

Algae Species and Percent Content

| Algae strain | Proteins (% weight) | Carbohydrates (% weight) | Lipids (% weight) | Nucleic acids (% weight) |
|---|---|---|---|---|
| Chlorella vulgaris | 51-58 | 12-17 | 14-22 | 4-5 |
| Dunaliella salina | 57 | 32 | 6 | — |
| Spirulina maxima | 60-71 | 13-16 | 6-7 | 3-4.5 |
| Synechoccus sp. | 63 | 15 | 11 | 5 |
| Aphanizomenon flos-aquae | 60-70 | 20-30 | 2-8 | — |

Data from Becker, Microalgae: biotechnology and microbiology (ed. Baddily et al., Cambridge, New York) p. 178 (1994).

In some embodiments of the process of the invention, process conditions can reduce or minimize the generation of gaseous products such as carbon dioxide, hydrogen, methane, and carbon monoxide.

Algae-derived synthetic coal products of the invention may have one or more of the following characteristics: an organized microstructure; higher hydrogen and higher nitrogen contents as compared to bituminous coal and synthetic lignocellulosic coal; low or undetectable amounts of elemental sulfur and/or heavy metals; low ash contents; and comparable heat of combustion as compared to bituminous coal, and generally higher heat of combustion as compared to synthetic lignocellulosic coal. In some embodiments, the hydrogen content (% H) of coal products of the invention is at least 40% greater than that of natural coal. In other embodiments, the % H can be at least 50%, 60% or 70% greater than in natural coal. The % N in some embodiments of the invention is at least 500% greater than in natural coal, and in others, is at least 700% greater than in natural coal.

Some of the comparative differences between algal and lignocellulosic synthetic coals may, in part, be attributed to some the major differences between algae and lignocellulosic plants. Algae are single celled microorganisms which contain almost no lignin or cellulose, whereas lignocellulosic plants contain many types of specialized cells and a preponderance of lignin, hemicellulose and cellulose. As a result, cell wall components of algal materials such as proteins, carbohydrates and lipids play a significant role during hydrothermal processing. Applicants have discovered that algae and lignocellulosic materials differ in response to hydrothermal carbonization reaction conditions and the differences can be advantageously exploited in process efficiency. Applicants have observed that the hydrothermal carbonization process increases the carbon-to-oxygen ratio of the resultant synthetic coal product primarily through dehydration rather than generation of gaseous products such as carbon dioxide, carbon monoxide, hydrogen and methane.

Furthermore, Applicants have discovered that much of the carbon content of algae processed through hydrothermal carbonization becomes transformed into the form of water-soluble compound by-products rather than being retained in the insoluble synthetic carbon product, and these by-products can have separate uses. This is in contrast to lignocellulosic materials in which almost all of the carbon content is retained in solid reaction products. See, for example, M. Titirici et al., New J. Chem, 31 pp. 777-785 (2007).

The invention also provides a process for preparing an algae-derived synthetic coal product. In an embodiment of process of the invention, the process comprises the steps of: providing a starting alga material comprising a concentrated algae-containing aqueous composition; subjecting said starting material to hydrothermal carbonization; filtering the resulting solid materials to separate said solid material from the aqueous filtrate, the solid materials being the algae-derived synthetic coal product; and separately collecting the algae-derived synthetic coal product and the filtrate. As previously noted, the filtrate itself is a useful product and may be further processed to provide other useful products. In another embodiment, the process can further comprise a preliminary water removal step to increase the concentration of algae in water for the starting material. Preferably, the concentration of aqueous algal composition can be from between about 2% to about 40% on a weight basis.

In preferred embodiments, the process further comprises the step of adding an acidic buffer or catalyst to the aqueous algal suspension prior to the hydrothermal carbonization step and reuse of an aqueous filtrate as suspending medium in a subsequent hydrothermal carbonization reaction. Applicants have found that filtrate reuse can increase mass yield of algal coal product by subsequently accessing non-agglomerated, highly carbonized but nano-sized colloidal material remaining in the filtrate in the next reaction. In some embodiments of the invention, the hydrothermal carbonization process is performed using a temperature ranging from between about 170° C. and about 225° C., for a duration ranging from a period of about 0.5 hour to about 6 hours, and a pressure up to about 350 psi. A solid or semi-solid algae-derived coal product is obtained, along with a aqueous filtrate composition that can be further downstream processed. One unusual feature of the process of the invention is that the dehydration reaction occurs within an aqueous environment.

The concentration of the algal species in water can affect the overall efficiency of processes of the invention. Without being bound by theory, Applicants believe that lysis of microalgal cells occurs releasing cellular components that undergo dehydrative carbonization under the reaction conditions and particle-to-particle reactions of this carbonized material can occur, creating the agglomerated synthetic coal product of the invention. Microalgae have high surface areas and can be heated quickly to desired reaction temperatures, with the result being that shorter processing times are required. The methods of the invention can be carried out as a batch process or a continuous process in a continuous flow reactor.

In general, the higher the particle concentration per unit volume of water, the more agglomeration and bulk mass creation can occur, and a larger yield of the synthetic coal product can be obtained. As is documented in FIGS. 14A-14C and discussed later herein with respect to Examples 22-25, in addition to the choice of particular algae starting material, the concentration of algae in the aqueous suspension of the starting material can affect the output quality and yield of the process. Concentrations of algae in the starting suspension can be between about 2% to about 40% phw, and also can be between about 5% to about 30% phw. The starting concentration of algae can vary according to species according to the density values associated with the particular species. For example, *Chlamydomonas reinhardtii* possesses a relatively low density which, by centrifugation, can provide about a 10 weight percent product in water. This suspension is still sufficiently fluid to be readily removed from centrifugation apparatus and transferred directly into the hydrothermal carbonization process as the "starting" material. On the other hand, *Aphanizomenon flos-aquae* possesses a higher density approaching about 30 percent weight by centrifugation and is still sufficiently fluid to be transferred from a centrifuge directly into the process.

When transporting starting algae from a natural lake or algal water source, some means of removing initial water content can be employed in order to obtain a more useable concentration of wet algae. Natural aquatic algae concentrations are generally limited to concentrations of about less than 0.1% (comparing dry weight of the algae to water). Thus, for process systems employing natural aquatic algal sources, a preliminary water removal and concentration method will be utilized to provide a concentrated algae-containing aqueous composition. Any of a number of methods known to those skilled in the art may be utilized to concentrate the aqueous composition and provide a composition having more desirable or efficiently utilized weight percent of algae to water. One such method that can be used for preliminary water removal is exposure of algal water mixtures to drying air convection, such as the warmth of the sun. Another method that can be used is centrifugation, for example with a continuous centrifuge with a skimmer separator. Any other microfiltration method or techniques known to those skilled in the may be useful in this phase of the process.

The process of the invention optionally can include the use of buffers or catalysts, added salts to increase ionic strength, and multiple use of an aqueous suspending medium. Buffers and catalysts can be added into the aqueous algal mixture prior to proceeding to the hydrothermal carbonization stage. Suitable buffers or catalysts that can be employed in the process include those compounds that afford an acidic pH to the mixture. Polyacidic pH buffers that can be used include, but are not limited to, citric acid and oxalic acid. Polyacidic pH buffers which contain significant concentrations of carboxylate (basic) and carboxyl (acidic) functional moieties are preferred. Mass yields of the algal coals can be increased by reuse of an aqueous filtrate in a subsequent hydrothermal carbonization reaction. It is believed that pre-assembled, possibly nanosized colloidal particles that would not be trapped by a conventional filter may remain in a reaction product mixture. Re-employment of the filtered "solution" has been found to result in increased yields being obtained in the next reaction sequence. Similarly, addition of highly soluble inorganic salts such as sodium sulfate will provide increased ionic strength in the aqueous suspending medium and will facilitate agglomeration of organic carbonized material, thus providing increased mass yields.

Catalytic agents that can be used in the process of the invention include those providing high levels of carbon yield content in the synthetic coal product, while concurrently providing high chemical yields of the synthetic coal. Suitable catalytic agents include, but are not limited to, Bronsted acids and Lewis acids. Suitable Bronsted acids include oxalic acid, citric acid, boric acid, and sulfuric acid, and combinations thereof. Suitable Lewis acids include $FeCl_3$ and $AlCl_3$. Amounts of buffer and catalyst agents that can be used can range from between about 0.1 to about 5.0 weight percent based on algae weight, preferably from between about 1.0 to about 4.0 weight percent based on algae weight.

The yield and quality of algal coal of the invention can be affected by various process parameters and conditions—particularly temperature, time and pressure during hydrothermal carbonization. The process of the invention can be performed at temperatures between about 170° C. and about 225° C., preferably between about 190° C. and about 215° C. As previously noted, the process of the invention can be generally performed within a time period of less than about 6 hours. In some embodiments, the process can be performed for a duration ranging from between about 0.5 hour up to about 6 hours, between about 1 hour to about 4 hours, or between about 0.5 hour to about 1 hour. For some other embodiments, process time may range between about 0.1 hour to about 1 hour, or about 0.1 hour to about 0.5 hour.

In addition to the advantages of relatively low temperature parameters and associated reduced energy usage of the process, the pressure conditions needed for the process of the invention are also relatively low and conservative. The process can be conducted at a pressure of about 350 psi and less, of which about 70% of the pressure, or 225 psi at 200° C., is due to $H_2O$ vapor pressure.

The hydrothermal carbonization step of the process can be conducted within a pressure-sustaining batch reaction apparatus or a continuous flow reactor. Batch reactor apparatuses that can be used include commercially available vessels capable of generating the temperatures (up to about 225° C.) and sustaining the pressure conditions (<350 psi) in aqueous process conditions associated with the invention. Useful reactor systems are those that can accommodate the volume of materials to be employed in the process. Carbonization and dewatering apparatuses similar to that described in Bodle et al. U.S. Pat. No. 4,632,731 can be used, the entire text of which is incorporated herein by reference.

In one embodiment, suitable apparatuses that can be used include those which can conduct a continuous process. Depending on how configured and the material of construction, continuous process systems can be operated at higher temperatures and the hydrothermal carbonization process may be carried out at shorter time periods (e.g., 1 to 5 minutes) to achieve results similar to batch conditions. Such as system (for lignocellulosic processing) is described in Bobleter et al., *J. Appl. Polymer Sci.*, 20, pp. 2083-2093 (1976).

The invention includes a practical application of a method of using the algae-derived synthetic coal prepared in accordance with the invention as an energy resource comprising employing said algae-derived synthetic coal product as a carbon source within a combustive thermal energy generation system, or coal combustion system. Examples of combustive thermal generation systems in which the product of the invention can be employed include, but are not limited to, boiler plus furnace systems, supercritical turbine systems, combined cycle power systems, combined heat and power cogeneration systems, and the like. In addition to the product of the invention being separately utilized, the process of the invention can be modified for large industrial scale operation and incorporated as a front-end part of a unified combustion thermal generation system using the product.

As previously mentioned, the algae-derived coal product of the invention can be used in a coal gasification process. In such a process, syngas (a mixture of carbon monoxide and hydrogen gas) can be prepared from some embodiments of algal coal of the invention. Syngas can, in turn, be converted into transportation fuels or industrial chemicals such as methanol, ethylene glycol, acetic acid, and the like.

Figure 2:
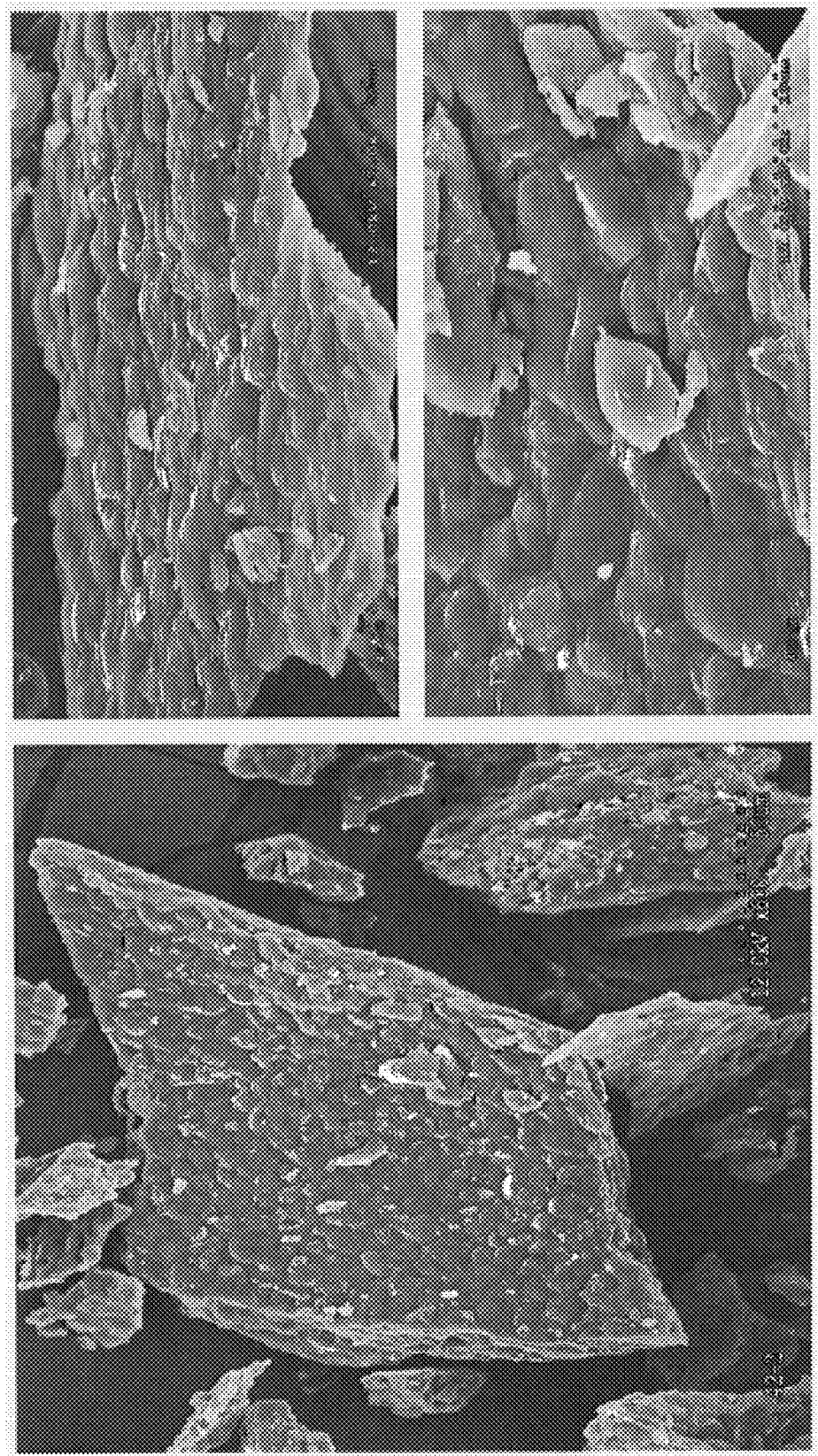
FIG. 2 is a series of SEMs of freeze-dried *Chlamydomonas reinhardtii* at 600×, 2000× and 3000× magnification employing an accelerated voltage of 12,000 volts.

Following the hydrothermal carbonization step, the reaction mixture is then cooled and the insoluble content of the mixture can be separated from the water-soluble contents by filtration. Certain algae, namely microalgae, because of their size (microns) can form a flat layer and thus clog direct filtration devices Referring to FIG. 2, for example, there are shown three micrographs of a flat lamellar structure of microorganisms (*Chlamydomonas*) that singly have dimensions of about 5 μm in diameter. The freeze-dried alga form a substantially continuous film of assembled, lamellar structures. It is visibly apparent from the images that Chlamydomonas will exhibit a strong tendency to clog direct filtration unit operations.

Figure 3:
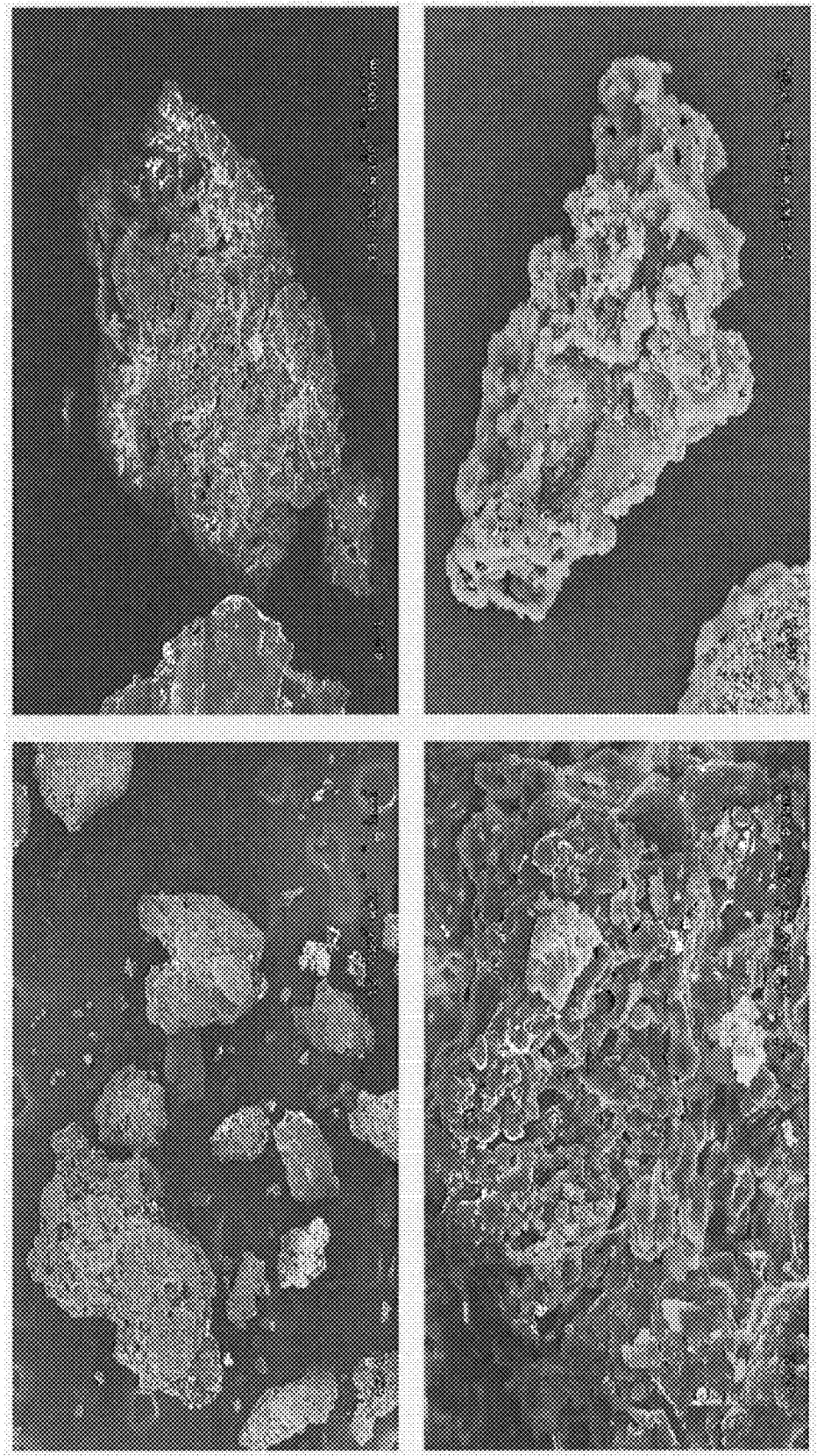
FIG. 3 is a series of SEMs at 50×, 300×, 1000×, and 1500× magnification of a synthetic coal sample prepared from algae by hydrothermal carbonization process according to one embodiment of the invention.

In contrast, chars prepared using the process of the invention filter relatively easily. In FIG. 3 displaying the hydrothermal carbonization product of *Chlamydomonas*, the char has a highly microstructured surface (as seen in the 1000× image) that can enhance filtration, and product mixtures can be easily filtered using conventional filter papers such as the WHATMAN brand (available from Schleicher and Schuell, Maidstone, United Kingdom).

The invention is further illustrated by and may be understood with respect to the following examples, none of which are intended to be construed as necessarily limiting the scope of claimed invention to the particular embodiments described therein.

EXAMPLES

Unless specifically mentioned otherwise, the following equipment, sources and parameters were utilized in the following examples.

Reactors employed in the examples were of two types: a 71 mL unstirred stainless steel reactor and a 450 mL stirred stainless steel reactor, both of which were purchased from Parr Instruments, Inc. (Moline, Ill.). Heating methods were of two types: an induction heating system (available from LC Miller, Co., Monterey Park, Calif.) and a resistive heating mantle arrangement (available from Parr Instruments, Inc). Rates of heating varied between the two arrangements, with the inductively heated system achieving the desired temperature more rapidly, but no differences in products were detected with the two methods.

*Chlamydomonas rheinhardii* CC-125 wild type mt+137c was obtained and used to inoculate 20 L carboys filled with 18 L of TAP medium (D. S. Gorman and R. P. Levine, Proc. Natl. Acad. Sci. USA 1965, 54, 1665-1669). *Synechocystis* sp. PCC (Item #:27184) obtained from ATCC (Manassas, Va.) were used to inoculate 20 L carboys filled with 18 L of BG-11 medium. Carboys were placed in fluorescent light rings producing 5960 Lux and sparged with air containing 5% carbon dioxide. Alga was harvested by centrifugation. All masses of biological and synthetic coal materials were recorded after employing a freeze drying procedure on frozen aqueous slurries, centrifugates, and filtered solids. The frozen composite (at −20° C.) in an appropriate thermally conductive container was placed on the drying shelf of a UNITRAP™ II Freeze Drier (obtained from Virtis Co., Inc., Gardiner, N.Y.). The drying shelf temperature was at least −20° C. or colder. When the vacuum had reached a level of less than 0.5 Torr., the refrigeration unit for the drying shelf was turned off, and the vacuum maintained (usually overnight) until the drying shelf temperature reached ambient levels.

Examples 1-5

Examples 1 through 5 were performed to evaluate the effect of varying temperature parameters during hydrothermal carbonization using starting alga *Chlamydomonas rheinhardii*.

Freeze-dried *Chlamydomonas rheinhardii* (3.0 grams), citric acid (0.09 gram; 3 weight percent based on alga), and 40 mL of deionized water were shaken and vortexed briefly in a 50 mL centrifuge tube. Once dispersed completely, the contents were poured into the 71 mL unstirred reactor, and the centrifuge tube was washed of any remaining material with 17 mL of water.

The reactor was sealed and heated inductively to a set point of 210° C. (set points were typically exceeded by 6-7° C. with the induction heating system, so the average temperature was actually 213° C.). The reaction period at a given set temperature was two hours. When cool, the contents were vacuum filtered, and the undiluted aqueous filtrate was isolated and stored in the refrigerator. The moist filtered synthetic coal was washed with deionized water, frozen at −20° C., and freeze-dried as previously described. When dry, the mass of the coal was recorded, and a sample was submitted for carbon, hydrogen and nitrogen analysis to Galbraith Laboratories, Inc. (Knoxville, Tenn.). The average % C of two lots of starting *Chlamydomonas rheinhardii* was 51.9%.

TABLE 2

Comparative Temperature Data for *Chlamydomonas rheinhardii*

| Example | Temperature (° C.) | % C | % Yield Synthetic Coal |
|---------|--------------------|-----|------------------------|
| 1 | 213 | 62.8 | 20* |
| 2 | 203 | 65.3 | 34 |
| 3 | 193 | 60.4 | 34 |
| 4 | 183 | 61.7 | 37 |
| 5 | 173 | 59.0 | 39 |

*Some incidental, mechanical loss of solid occurred during filtration.

As can be seen from the above results, the best reaction temperature for *Chlamydomonas rheinhardii* as a starting alga material in hydrothermal carbonization process was about 200° C. based on the yield and % C in the coal product.

Examples 6-13

Examples 6 through 13 were conducted to evaluate the effectiveness of various buffers and catalytic agents in the hydrothermal carbonization process. A companion reaction with no additive, and alga that had been washed using a cross-flow filtration system to remove any metal salt solutes that may have been present, was prepared as a control. Other additives (Examples 7-13) were also evaluated at the same molar level as $CaCl_2$ of Example 6. The reaction temperature for each example was 213° C. with a reaction time of two hours. The remaining equipment, sources and conditions were similar to those described above in Example 1. The resulting data is set forth in the following Table 3.

TABLE 3

Comparative Data using Various Additives

| Example | Additive | % C | % Yield Synthetic Coal |
|---------|----------|-----|------------------------|
| Control | None | 62.3 | 29 |
| 6 | $CaCl_2$ | 58.9 | 28 |
| 7 | Citric acid | 61.4 | 31 |
| 8 | $MgCl_2$** | 56.6 | 29 |
| 9 | Oxalic acid** | 65.9 | 31 |
| 10 | $FeCl_3$ | 62.3 | 37 |
| 11 | Boric acid** | 65.2 | 33 |
| 12 | $AlCl_3$** | 64.2 | 35 |
| 13 | $H_2SO_4$ | 66.0 | 31 |

**Additive was reported to be effective catalytic agent in Japanese Nippon Kagaku Zasshi 69, 81 (1948).

As can be seen from the above results, all tested additives (and even the control with no additive) caused an increase in % C from 51.9% for starting alga material *Chlamydomonas*. Both $CaCl_2$ and $MgCl_2$ may actually be inhibitors to carbonization, however, since % C values were lower as compared to the control. This is somewhat surprising because these metal salt additives were described in the earlier Japanese report as being among the most effective catalysts. While several of the more effective additives achieved a level of % C of about 65%, oxalic acid was probably the most environmentally acceptable additive that also created a high degree of carbonization. Sulfuric acid was also effective, but this very strong acid can cause undesirable deterioration of stainless steel equipment.

Examples 14 and 15

Examples 1 through 13 were conducted using a small unstirred reactor. Examples 14 and 15 were performed to evaluate the effects of scale-up (from 71 mL to 450 mL reactor) on the process of the invention, and to ascertain whether stirring has any effect on the inter-alga reactions.

Example 14 was conducted using *Chlamydomonas rheinhardii* (10 grams), oxalic acid (0.23 gram), and deionized water (190 mL) to achieve an algal % solids of 5%. The mixture was placed in the 450 mL autoclave and stirred at a rate of 120 rpm. The contents were heated to 213° C. for 2 hours. Example 15 was conducted similarly, but with a slower stir rate of 63 rpm. The resulting data is set forth in the following table.

TABLE 4

Comparative Data using Differing Stirring Rates

| Example | Parameters | % C | % Yield Synthetic Coal |
|---------|-----------|-----|------------------------|
| 14 | 213° C.; 2 hrs; 3.3X scale up; 120 rpm stir rate | 64.8 | 20 |
| 15 | 213° C.; 2 hrs; 3.3X scale up; 63 rpm stir rate | 64.6 | 24 |

These results show that with other conditions and parameters remaining the same, yields in both Examples decreased slightly on scale-up as compared to Example 9 (31%) above conducted with the smaller unstirred reactor. Examples 14 and 15 also show that stirring rate has only a moderate effect on % yield, i.e., increasing stirring rate decreases yield. This trend may be associated with inter-particle reactions.

Examples 16-20

Different starting alga materials from different species and combinations of microalgae were prepared and subjected to hydrothermal carbonization process according to the invention to evaluate the qualitative differences in elemental content of the resulting synthetic coal. The process was similar that set forth above in Example 15. The data is set forth in the following table.

TABLE 5

Comparative Data using Different Starting Microalgae Materials

| Example | Alga | Conditions | % C | % H | % N | % Yield Synthetic Coal |
|---------|------|-----------|-----|-----|-----|------------------------|
| — | *Aphanizomenon flos-aquae* | Spray-dried | 48.1 | 7.4 | 11.5 | — |
| 16 | *Aphanizomenon flos-aquae* | 5% solids; 213° C.; 2 hrs; 2% citric acid | 62.7 | 8.5 | 7.1 | 16 |
| — | *Synechocystis* sp. | Freeze-dried | 48.2 | 7.3 | 9.1 | — |
| 17 | *Synechocystis* sp. | 5% solids; 213 ° C.; 2 hrs; 2% citric acid | 67.3 | 9.1 | 5.5 | 18 |
| — | *Scenedesmus/Chlorella* blend | Freeze-dried | 43.3 | 6.7 | 7.2 | — |
| 18 | *Scenedesmus/Chlorella* blend | 7.5% solids; 203 ° C.; 3 hrs; 2% oxalic acid | 53.8 | 7.0 | 3.5 | 39.0 |
| — | *Spirulina* | Spray-dried | 44.4 | 6.2 | 7.3 | — |
| 19 | *Spirulina* | 15% solids; 213 ° C.; 3 hrs; 2% oxalic acid | 58.4 | 6.7 | 6.6 | 27 |
| — | *Chlorella* | Spray-dried | 50.8 | 7.2 | 10.1 | — |
| 20 | *Chlorella* | 10% solids; 200 ° C.; 3 hrs; 2% oxalic acid | 64.3 | 8.1 | 7.0 | 34 |
| — | *Nannochloropsis* | Freeze-dried | 49.4 | 7.2 | 7.4 | — |
| 21 | *Nannochloropsis* | 20% solids; 200 ° C.; 2 hrs, 2% oxalic acid | 62.6 | 8.0 | 4.2 | 37.0 |

*Aphanizomenon flos-aquae* (obtained from Klamath Algae Products, Inc., Klamath Falls, OR); *Synechocystis* sp.; Mixed = Blend of *Scenedesmus* and *Chlorella* (obtained from a local Minnesota lake); *Spirulina* (purchased from a local health food store); *Chlorella* (purchased from a local health food store); *Nannochloropsis* (Brine Shrimp Direct, Ogden, UT).

As can be seen form the above results, the yields of synthetic coals obtained from the cyanobacteria that gave relatively high % C values (*Aphanizomenon flos-aquae* and *Synechocystis* sp.) are generally lower, e.g., about half, compared to those obtained from the green microalgae (*Chlorella* and *Nannochloropsis*). The *Scenedesmus/Chlorella* blend and *Spirulina* algal substrates gave relatively low % C values.

Examples 22-24

Examples 22 through 24 were conducted to evaluate the relationship between starting alga concentration and the corresponding effect on percent yield of synthetic coal product. The process was performed using the larger stirred reactor and oxalic acid catalyst (2.3 weight percent based on alga). *Aphanizomenon flos-aquae* was utilized as the alga substrate for Examples 22 and 23 employing conditions similar to Example 16 above (conducted at 5% solids; results=62.7% C and 16% yield). *Chlamydomonas rheinhardii* was the algal material for Example 24 which was conducted using a three hour reaction period.

The resulting data is set forth in the following Table 6.

TABLE 6

Comparative Data for Varying Concentrations and Yield

| Example | Alga | Concentration (% solids) | Temperature (° C.) | % C | % Yield Synthetic coal |
|---|---|---|---|---|---|
| 22 | Aphanizomenon flos-aquae | 10 | 213 | 69.6 | 22 |
| 23 | Aphanizomenon flos-aquae | 15 | 213 | 64.7 | 26 |
| 24 | Chlamydomonas rheinhardii | 7.5 | 203 | 72.7 | 39 |

As can be seen from the above data, it was observed that a higher the concentration of the alga in water corresponded to a greater percent yield of synthetic coal. Example 24, (compared to Example 15 conducted at 5% solids and 213° C.) demonstrated that the combination of higher percent solids with slightly reduced reaction temperature provides a significant % yield benefit of about 15%, as well as the higher % C obtained in these experiments. Example 24 also demonstrates that Chlamydomonas reinhardtii is a preferred algal substrate in terms of % C and yield of synthetic coal.

Example 25

This example teaches that the hydrothermal carbonization process can be optimized and tailored for a given strain of alga. In the following three variable, two level factorial experiment with replicated centerpoints (200° C.), Dunaliella salina, obtained from Alibaba, Inc., was examined as substrate. The reaction space involving the input variables of temperature (190-210° C.), reaction time (0.5-2.0 h) and % solids of the alga (5-25%) in distilled water containing 2.3 wt % oxalic acid was examined. % Carbon recovered in the algal coal was computed by dividing the amount of carbon in the algal coal (% C times the mass of coal) by the amount of carbon in the starting alga (% C time the mass of the alga).

TABLE 7

Comparative Data using Different Temperatures

| Temp. (° C.) | Time, h | % Solids | % Mass Yield | % Carbon Recovered in the Algal Char |
|---|---|---|---|---|
| 190 | 0.5 | 5 | 28.4 | 40 |
| 190 | 0.5 | 25 | 45.7 | 62 |
| 190 | 2.0 | 5 | 29.3 | 40 |
| 190 | 2.0 | 25 | 42.9 | 61 |
| 200 | 1.25 | 15 | 39.3 | 55 |
| 200 | 1.25 | 15 | 39.0 | 56 |
| 200 | 1.25 | 15 | 37.4 | 55 |
| 200 | 1.25 | 15 | 38.1 | 55 |
| 210 | 0.5 | 5 | 27.9 | 40 |
| 210 | 0.5 | 25 | 42.1 | 60 |
| 210 | 2.0 | 5 | 25.3 | 38 |
| 210 | 2.0 | 25 | 38.8 | 57 |

A linear regression equation was developed from the orthogonal factorial design:

% Carbon Recovered = $51.54 - 1.375\, X_1 - 0.375\, X_2 + 9.875\, X_3$ where $X_1$ = dimensionless temperature; $X_2$ = dimensionless time; and $X_3$ = dimensionless % solids Analysis of variance (ANOVA) showed that % solids was significant at the 99% confidence level, and temperature was significant at the 95% confidence level. Time was not statistically significant which has positive implications for scaling from batch to continuous processing methods by employing reaction times even less than 30 minutes. Further statistical analysis indicated that the simple linear model did not explain all the variation in the experimental data. The significant interaction between temperature and time at the 95% level indicated a non-linear response surface.

Figure 14A:
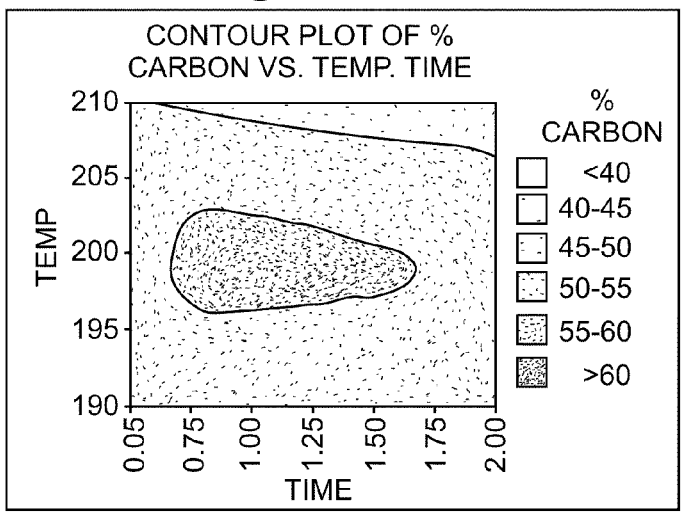
FIGS. 14A, 14B and 14C are a collection graphs of % carbon contour plots of data in Table 7 of Example 25, with darker regions representing higher % carbon levels in algal char.
Figure 14B:
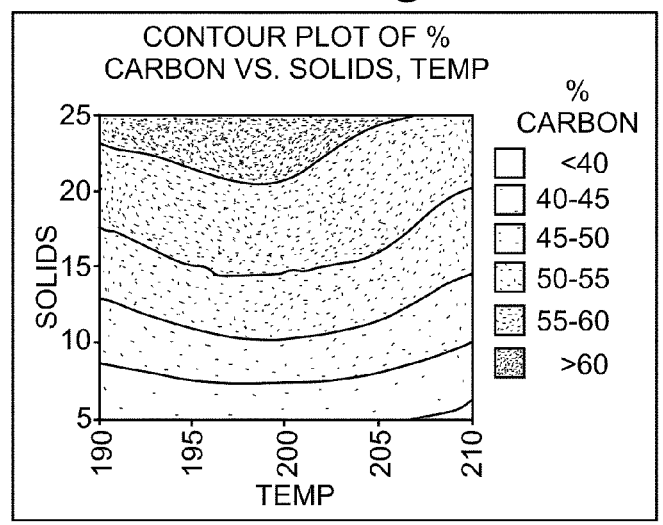
Figure 14C:
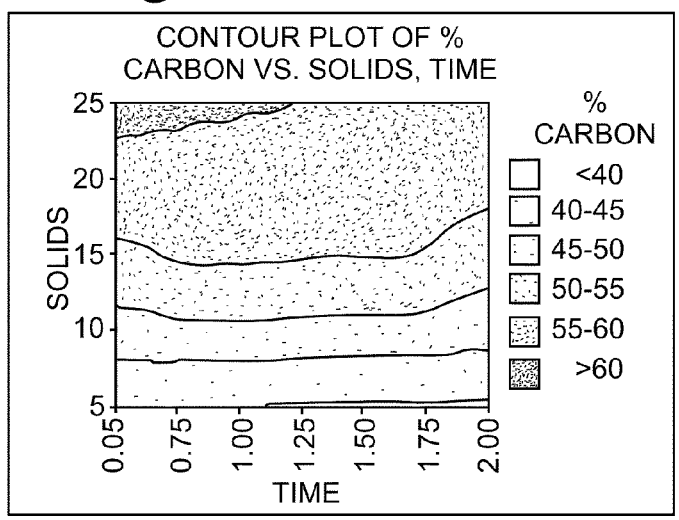

These data are plotted graphically in FIG. 14. Overall, these results suggested that the processing window was relatively wide. FIG. 14A is a plot of % carbon recovered in the algal char at different temperatures and times, and darker regions represent higher % carbon yields. The topographical response surface is fairly "flat" in that not much is changing with regard to these two input variables. By contrast, FIGS. 14B and 14C that involve algal concentration (% solids) with temperature and time, respectively, show considerable change and "relief" present in both plots due to the significant importance of concentration of the alga. Furthermore, FIGS. 14B and 14C indicate that an undesirable "over cooking" is indicated both at the high reaction temperature and reaction time. These observations suggest that continuous processes might be developed by employing even higher % solids at temperatures of less than 200° C. with reaction times even shorter than 30 minutes to provide acceptable char products in terms of carbonization and yield.

Example 26

This example teaches that the mass yield can be improved by employing the aqueous filtrate from one process run as the suspending medium in a subsequent process run. In this example, Dunaliella salina was examined at 15% solids, 200° C. and for 2 h in distilled water. The "0" run # in the table below was the initial reaction conducted in distilled water. Subsequent runs were conducted sequentially employing the filtrate from the previous run. The results are present in Table 8.

TABLE 8

Comparative Yield Data for Filtrate Reuse

| Run # | % Char Yield | % C | % H | % N |
|---|---|---|---|---|
| 0* | 40.0 | 68.4 | 7.4 | 6.2 |
| 1 | 42.8 | 68.0 | 7.6 | 6.5 |
| 2 | 47.7** | 64.1 | 7.3 | 7.1 |
| 3 | 48.3 | 63.9 | 7.7 | 6.3 |
| 4 | 49.9 | 64.2 | 7.9 | 6.9 |

*= The initial run at 200° C., 15% solids, for 2 h. Distilled water was the suspending medium.
**= Some mechanical losses were observed and the reported yield is an estimate.

The data shows that as the filtrate is reused the char yield increases. The standard deviation of the elemental analysis data is 0.6% and that of the char yield data 0.8%. Correspondingly, the level of carbonization as indicated by the % C values decreases slightly with increasing number of reuses.

Example 27

This example teaches that increasing the ionic strength of the aqueous suspending medium results in increased mass yields with no loss in carbonization efficiency. *Dunaliella salina* is a salt water microalgae and was obtained as a spray-dried material from Alibaba, Inc. When this alga was subjected to hydrothermal carbonization at 15% solids, at 200° C., and for 2 hours in distilled water, an algal coal was obtained in about 40% yield with a % C of about 65%. The salt concentration, originally present in the sample from its salt water environment and also from salts created in the hydrothermal process, was determined to be 1.4 M by conductivity measurements. In connection with the filtrate reuse experiments, it was of interest to examine the effect of the salt alone. Therefore, *Dunaliella salina* was subjected to 200° C., 15% solids and 2 hours in 1.4 M sodium sulfate in water. The result was an algal coal being obtained in 43.6% yield and a % C of 64.5. Therefore, a portion of the increase in mass yield obtained on reuse of the filtrate was due to the salt concentration and a larger portion could be attributed to the presence of carbonized, non-associated material either dissolved or suspended in the aqueous filtrate.

Example 28

The synthetic coal product obtained according to the invention was characterized in terms of several properties: microstructure, composition and energy content. In addition to being characterized, the synthetic coal product of the invention was compared to natural bituminous coal and a synthetic coal obtained from a lignocellulosic substrate.

A synthetic coal product prepared according to the invention and described in Example 24 above was compared to natural bituminous coal (Powder River Basin Coal referred to as sub-bituminous) obtained from Xcel Energy, Inc. (Riverside plant; St. Paul, Minn.). This natural coal material is actually utilized as an energy source for the commercial production of electricity. The lignocellulosic synthetic coal was prepared as indicated in Comparative Example 1 below.

Visual Differences

The microstructure of natural coal under differing magnifications is shown in FIG. 1. As can be seen from FIG. 1, natural coal exhibits a surface structure composed primarily of highly compacted "chunks" of material that possess no particular surface structure, other than a slightly flaky appearance at high magnification. This appearance is derived naturally from the high pressure and high temperature process caused by extensive sedimentation in the natural coal formation process.

Figure 4:
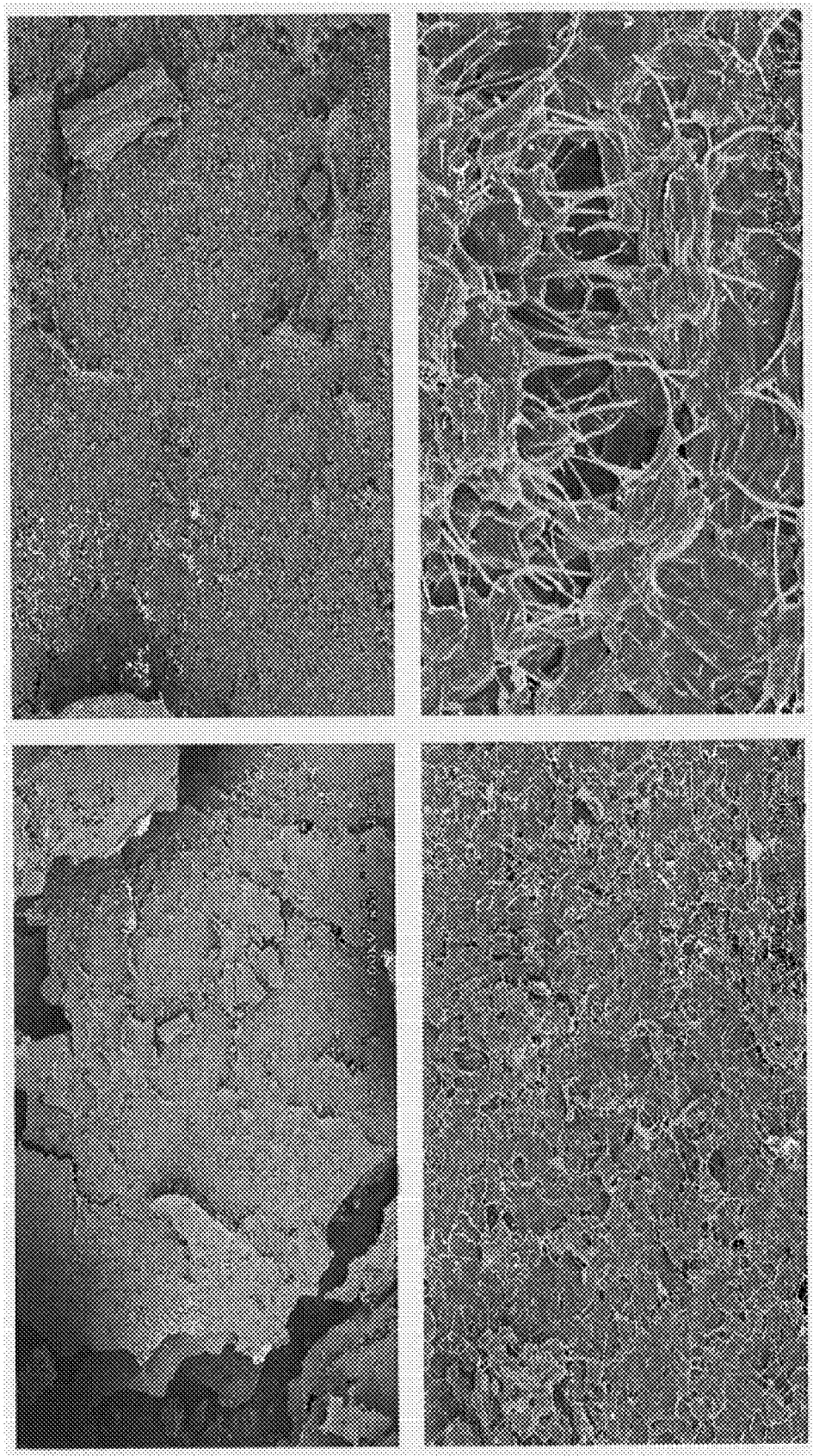
FIG. 4 is a series of SEMs from a mixed algae sample obtained from a Minnesota lake at 50×, 180×, 800× and 3000× magnification employing an accelerated voltage of 5000 volts.
Figure 5:
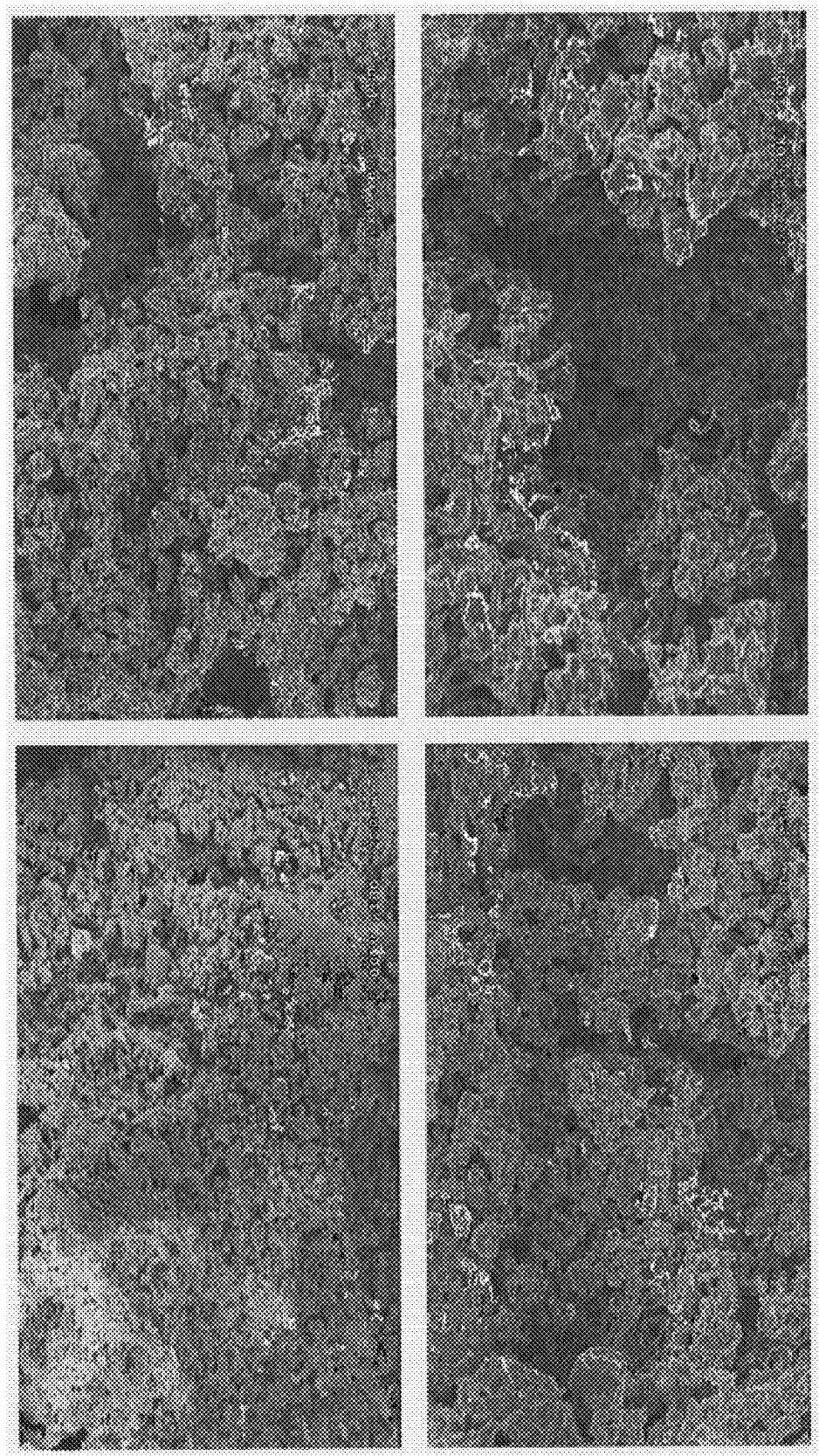
FIG. 5 is a series of SEMs of synthic coal prepared from mixed algae at 180×, 800×, 1800×3000× magnification prepared by hydrothermal carbonization process according to one embodiment of the invention.
Figure 6:
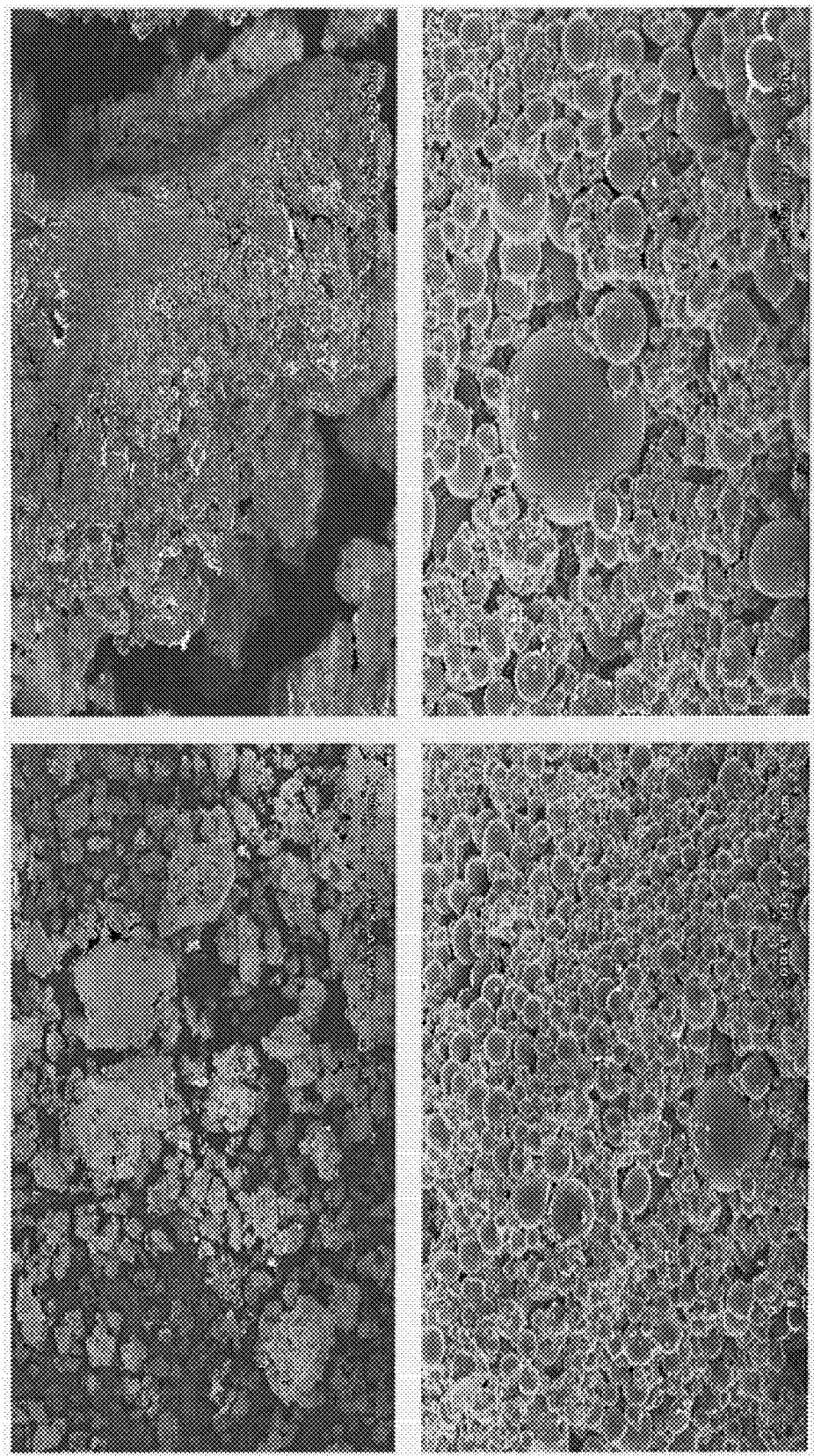
FIG. 6 is a series of SEMS of starting material *Synechocystis* sp. (cyanobacterium) at 50×, 250×, 1800× and 3000× magnification employing an accelerated voltage of 5000 volts.

The microstructure of synthetic coal products prepared in accordance with the invention appear in FIG. 3 (*Chlamydomonas*-derived synthetic coal), FIG. 5 (Minnesota Lake mixed algae blend-derived synthetic coal), FIG. 7 (*Synechocystis*-derived synthetic coal), and FIG. 9 (*Aphanizomenon*-derived synthetic coal) under different magnifications. Each of the synthetic coal product samples prepared according to the invention in FIGS. 3, 5, 7 and 9 exhibits relatively consistent and well-developed microstructured, often spheroidal surfaces of substantially larger surface area. The microstructure of the products prepared by the invention further substantially differ as compared to their corresponding natural pre-process counterpart microstructures of the starting alga material as can be seen with reference to FIG. 2 (Chlamydomonas starting material), FIG. 4 (Minnesota Lake mixed algae blend starting material, believed to be a blend of *Scenedesmus* spp. and *Chlorella* spp.), FIG. 6 (*Synechocystis* starting material) and FIG. 8 (*Aphanizomenon* starting material).

The algae-derived synthetic coal products prepared using the invention were also compared to an artificial coal product prepared from a woody plant material as a starting material. Referring now to FIG. 10, there is shown the surface microstructure of lignocellulosic prairie grass identified as "Little Bluestem." The corresponding synthetic coal product to the lignocellulosic grass subjected to hydrothermal carbonization is shown in FIG. 11. As can be seen from the images, the microstructure of the starting material and the synthetic product do not significantly differ in appearance from one another, despite the hydrothermal carbonization process having been conducted at a temperature of about 200° C. for a period of about 17 hours. This is probably attributable to the intact cellulose framework of the lignocellulosic material.

Elemental Composition and Ash Content

Alga-derived synthetic coals prepared by the invention were also compared to natural coal and lignocellulosic coal in terms of elemental composition in terms of weight percent values. Elemental analysis was performed on all samples and the resulting data are set forth in the following Table 9.

TABLE 9

Comparative Elemental and Ash Data

| Sample | Elemental Analyses | | | | Ash |
| --- | --- | --- | --- | --- | --- |
| | % C | % H | % N | % S | Wt. % |
| Natural Coal | 69.6 | 5.7 | 0.9 | 0.6 | 5.60 |
| Lignocellulosic Char (Comp. Ex. 1) | 62.3 | 5.6 | <0.5 | <0.5 | n.d. |
| Algal Char[a] | 72.7 | 9.7 | 5.2 | <0.5 | n.d. |
| Algal Char[b] | 66.3 | 7.9 | 7.3 | 0.5 | 0.33 |

[a] = Product (Ex. 24) obtained from HTC of *Chlamydomonas reinhardtii*.
[b] = Product (Ex. 25, 200° C.) obtained from HTC of *Dunaliella salina*.
n.d. = Not determined.

As can be seen from the elemental compositions, at least two significant differences are apparent in comparing alga-derived synthetic and natural coals. Both the hydrogen and nitrogen contents are significantly higher in the algal coals than that of natural coal. For the chars of Examples 24 and 25, the hydrogen contents are respectively about 70% and 40% greater that % H for natural coal; and the nitrogen contents are respectively about 500% and about 700% greater than for natural coal. Especially with very low molecular weight hydrogen, these values do not indicate insignificant or minor differences, because the values in the table are weight percentages. Natural coal may be depleted in nitrogen (and possibly hydrogen as well) as a result of being derived primarily from lignocellulosic biomass sources that contain relatively low amounts of protein or by the action of "nitrogen-fixing" bacteria over the very long time of formation. Comparison of the alga-derived and lignocellulosic coals arrives at the same conclusions because the lignocellulosic-derived coal and natural coal are compositionally very similar. The very low level of ash present in the algal coal sample is ca. 20 times less than that of natural coal, and this characteristic may be very important in applications such as conversion into synthesis gas that require low ash contents.

Another significant difference is that the algae-derived synthetic coal product contains substantially less, even undetectable levels, of elemental sulfur and/or heavy metal contents in contrast to the natural coal. Release of sulfur in the burning of natural coal has been associated with the generation of environmental and atmospheric pollutants when employed as an energy source. The above results also demonstrate that despite the elemental composition and ash content differences between algae-derived synthetic coal and natural coal, the carbon content is similar, and the product of the invention can be regarded as being "carbon-equivalent" to natural coal.

Energy Content

In another comparative experiment, algae-derived synthetic coal product was compared to natural and lignocellulosic coals in terms of British Thermal Units, or BTUs. The BTU is defined as a heat unit that will raise the temperature of one pound of water one degree Fahrenheit, and wherein 1 BTU=1054 joules=0.000293 kWh. 1000 BTU per hour=0.293 kilowatts. The resulting data (determined at Galbraith Labs, Inc., Knoxville, Tenn.) is set forth in following table.

TABLE 10

Comparative Heats of Combustion

| Sample | BTU/lb |
| --- | --- |
| Natural Coal | 12,293 |
| Lignocellulosic Coal (Ex. 30) | 10,482 |
| Algal Coal * | 13,577 |
| Algal Coal ** | 13,118 |

\* Obtained from *Chlamydomonos reinhardtii* (Example 24)
\*\* Obtained from *Dunaliella salina* (Example 25, 200° C.)

As can be seen from the above data, the alga-derived synthetic coals displayed greater heat of combustion values as compared to the natural coal and substantially greater heats of combustion compared to lignocellulosic coal. This demonstrates that algal coal according to the invention can have a heat of combustion that is greater than that of lingnocellulosic goal or about 10,500 BTU/lb or greater.

Example 28

An experiment was conducted to ascertain the energy efficiency of synthetic coal products prepared according to the invention. The measured heats of combustion of dry (freeze-dried) *Chlamydomonas rheinhardii* and synthetic coal derived from the same [obtained in ca. 40% yield (Example 24)] are 7,758 and 13,577 BTU/lb, respectively.

Starting with alga isolated using a continuous centrifuge (20,000×g), a suspension having about 10% solids is obtained that serves as the starting material for both processes. With the Chlamydomonas as the fuel source, in 10 pounds of suspension, 9900 BTU are required to remove the 9 pounds of water and obtain 1 dry pound of alga, from which 7758 BTU are generated. Because of the very significant energy cost of drying the alga, the net energy loss is 7,758−9900=−2142 BTU/lb for this process.

With the synthetic coal from Chlamydomonas as the fuel source, 10 pounds of the 10% solids suspension created by centrifugation can be utilized directly. In order to heat the suspension from 22° C. to 200° C., about 3300 BTU are required (assuming comparable heat capacities of water and alga). Given the moderate exothermicity of the hydrothermal carbonization reaction, temperature can be maintained at 200° C. for 3 hours without additional significant energy input. The synthetic coal product obtained after filtration is moist, weighs 0.63 lb, and has a % solids level of 63%. To obtain 0.4 lb of dry synthetic coal requires an additional 256 BTU to remove the water from the filtered, moist synthetic coal.

Therefore, the total heat required to provide 0.4 lb of dry synthetic coal is 3300±256=3,556 BTU, or 9202 BTU per pound of the synthetic coal. Its heat of combustion is 13,577 BTU/lb, and the overall result is net energy gain of 13,577−8890=+4687 BTU/lb with the synthetic coal. In conclusion, the synthetic coal of the invention, even with its attending thermal preparation process, is significantly more energy efficient as a fuel than the starting alga material.

Example 29

The general composition and utility of the aqueous solution (filtrate) product of the invention from Example 24 was analyzed for material content. Information regarding the characterization of the material includes: 1) the % solids of freeze-dried residue in the aqueous solution was 3.55% (measured gravimetrically); 2) the composition of the more structural elements of the material was % C=46.0, % H=7.1, % N=13.1% and % P=2.0%; 3) the salt content (determined by conductivity measurements) was 67.5 mM; 4) the pH was 6.13; and 5) ICP metal analysis results were as follows (those reported are metals present in concentrations greater than 1 ppm on upper line):

TABLE 11

ICP Metal Content of Process Filtrate

| Content (ppm) | 876 | 460 | 160 | 80 | 38 | 12 | 8 | 2 | 2 |
| --- | --- | --- | --- | --- | --- | --- | --- | --- | --- |
| Element | P | S | Mg | K | Si | Na | Ca | Mn | Mo |

Figure 12A:
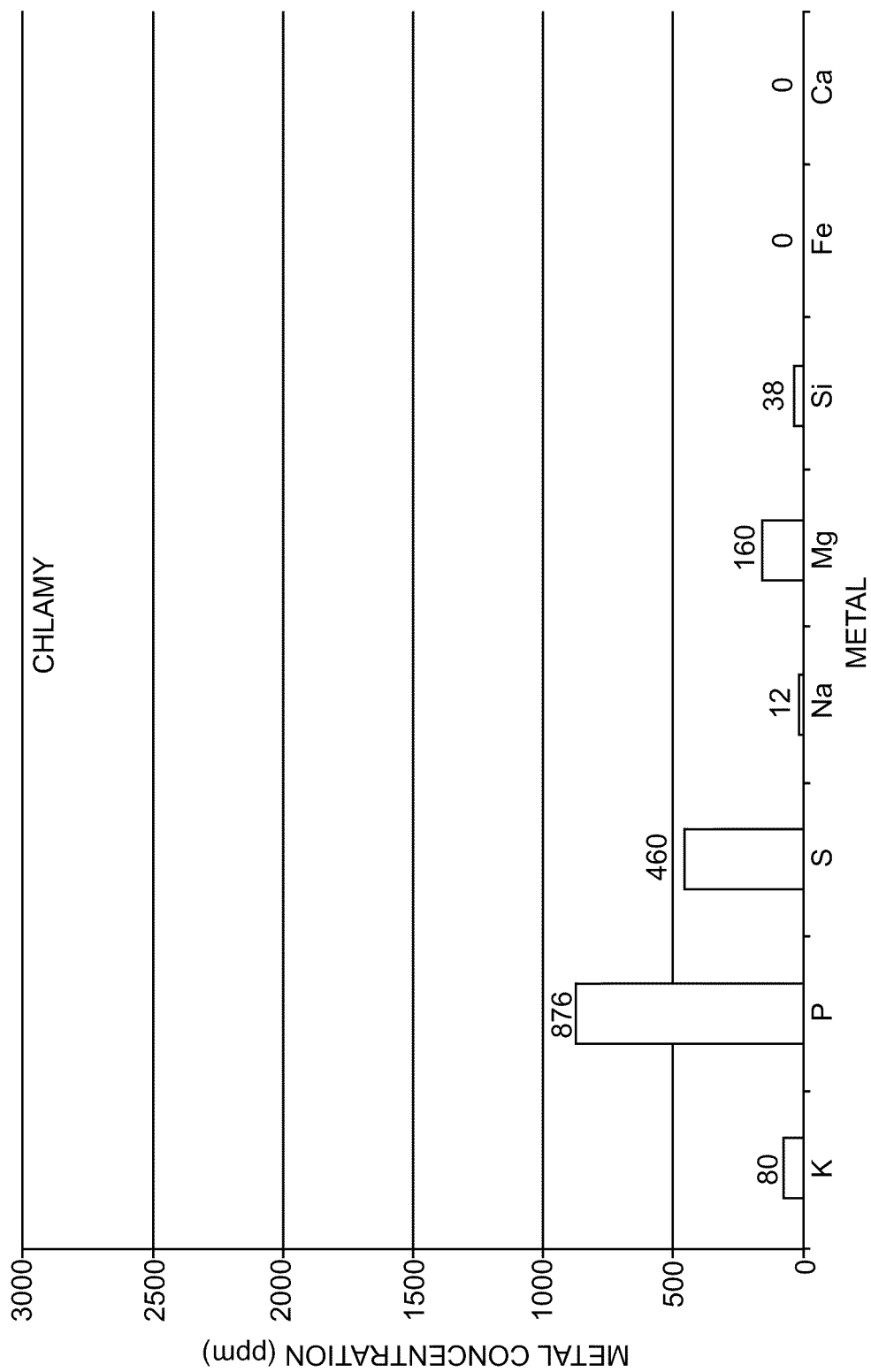
Figure 12B:
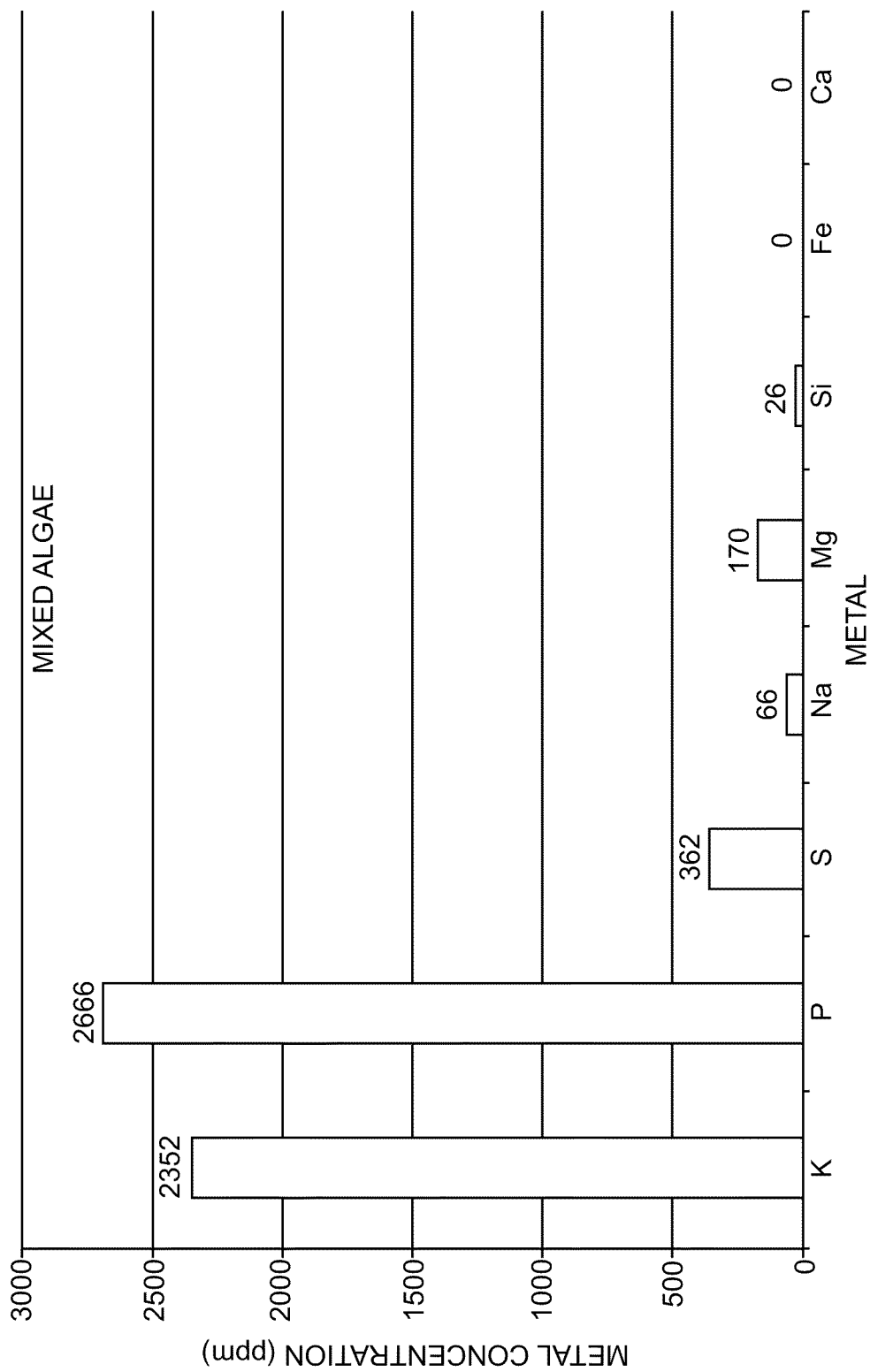
Figure 12D:
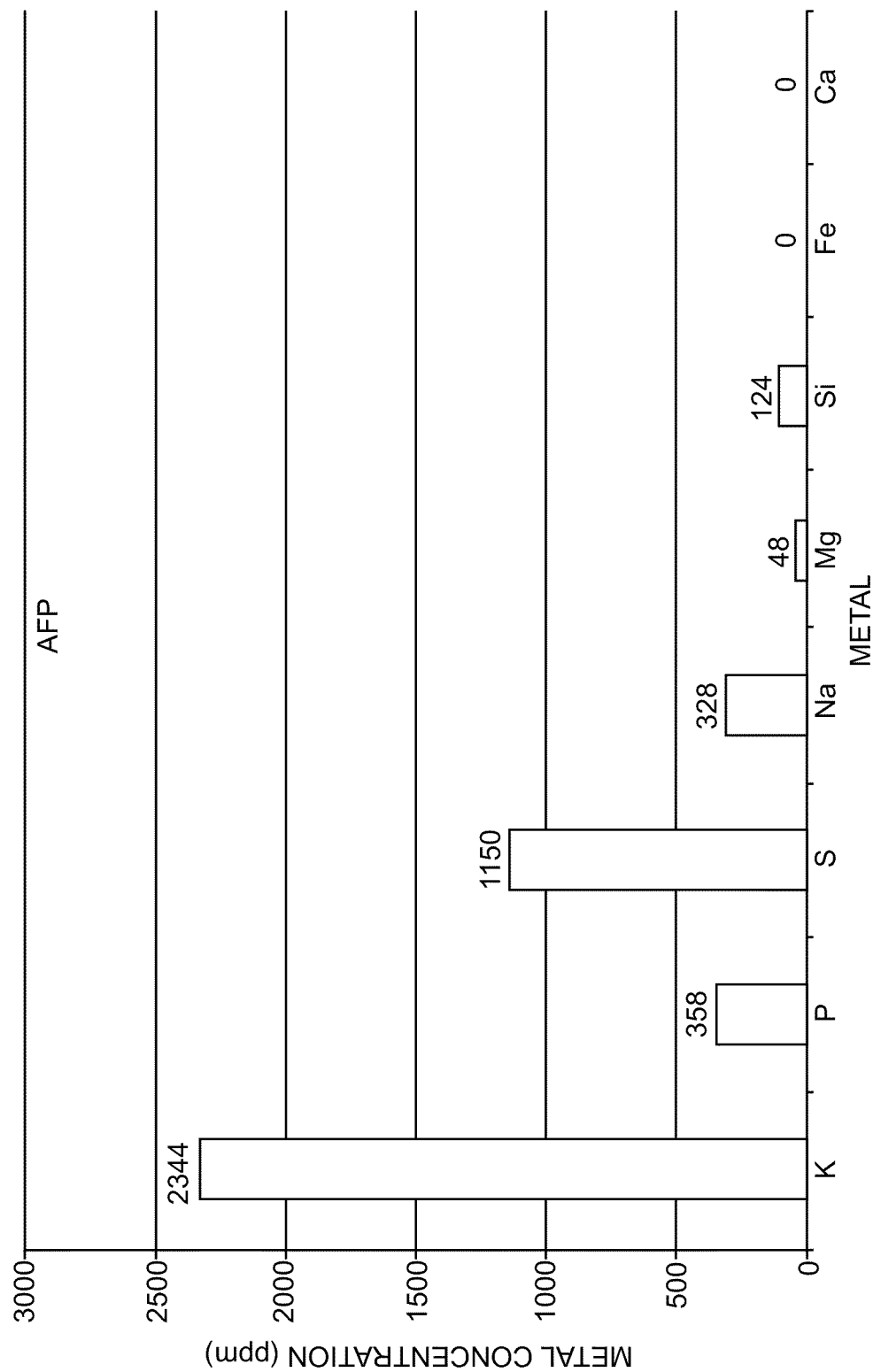

The predominant metals in the filtrate from *Chlamydomonas* are plotted graphically in FIG. 12, as well as predominant metals of the filtrates of the Minnesota mixed lake algae, *Synechocystis*, and *Aphanizomenon*. The elements that are present in the highest concentrations are reasonably consistent across the series and include potassium, phosphorous, sulfur and either sodium or magnesium.

Comparative Example 1

For purposes of further illustrating the invention, the hydrothermal carbonization of a lignocellulosic material was conducted for purposes of comparison. A monoculture prairie grass identified as "Little Bluestem" [having a lignin content of 20% and the following monosaccharide hydrolysis products: glucose (30%), xylose (15%), galactose (2%), arabinose (3%) and mannose (1%)] was selected as a starting material. A sun and air dried, brown colored sample of the grass was obtained and ground thoroughly into a powder (see FIG. 10) having components with primarily linear aspect and sizes less than 1 mm. The material was then subjected to conventional hydrothermal carbonization conditions, i.e., 10% solids, with added oxalic acid, at 200° C. for 17 hours (cf. Antonietti, et al., Chem. Mater. 2007, 19, 4205-4212). The freeze-dried brown filtered synthetic coal product was obtained in 57% yield.

Figure 13:
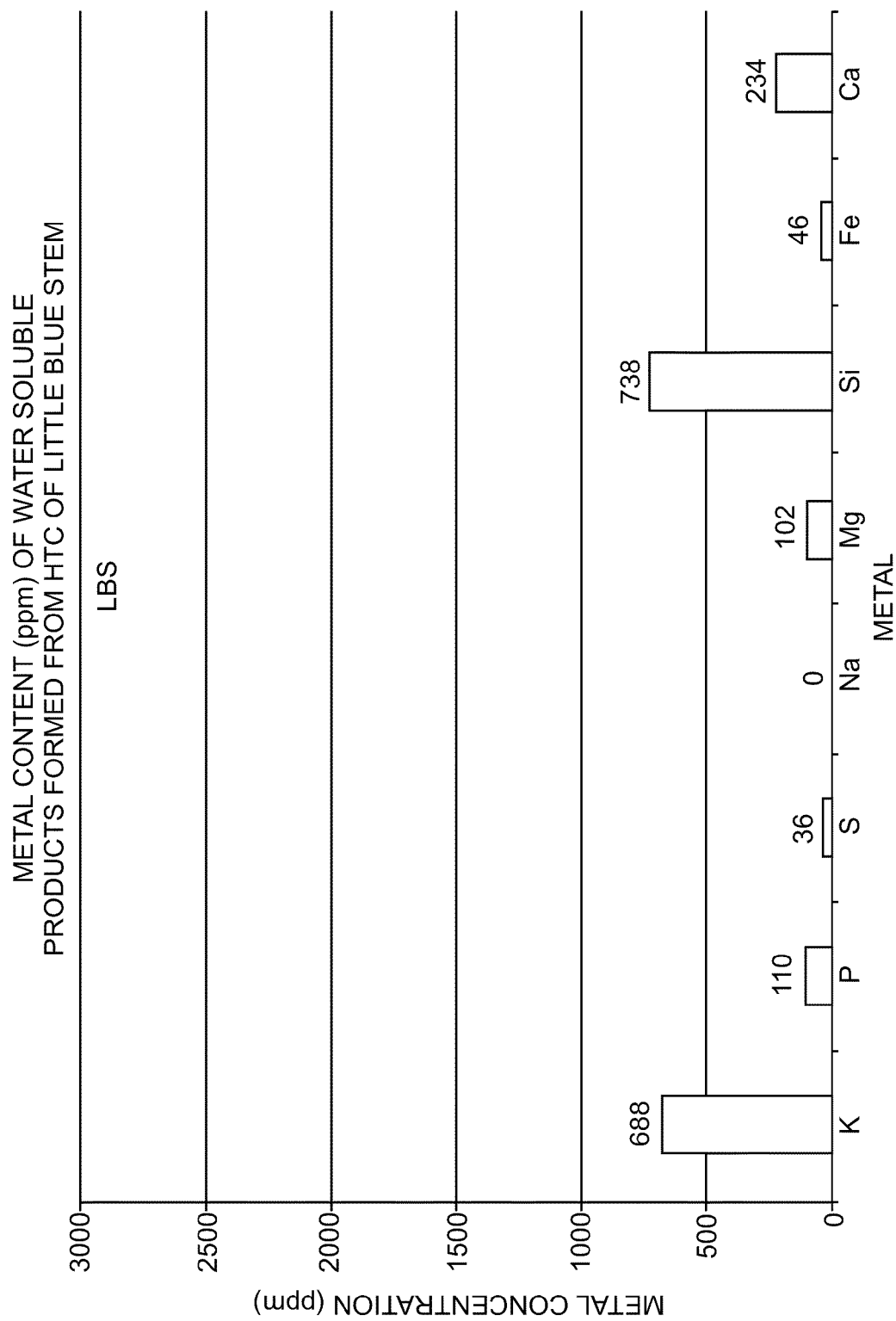
FIG. 13 is a bar graph showing the metals present in >1 ppm created by hydrothermal carbonization of lignocellulosic prairie grass *Schizachyrium scoparium* ("Little Bluestem").

The following characterization information was obtained regarding the aqueous solution and its solutes: 1) the % solids of freeze-dried material was 1.28% which is only 36% of that obtained with *Chlamydomonas* (Example 29); 2) compositions of the structural elements were % C=62.3; % H=5.6; and % N=<0.5%; 3) the salt content was 17.3 mM; 4) the pH was 3.38 and 5) the metal analysis (see FIG. 13) provided the following list of metals:

TABLE 12

| Lignocellulosic Filtrate Metal Content | | | | | | | | | | | | |
|---|---|---|---|---|---|---|---|---|---|---|---|---|
| Content (ppm) | 738 | 688 | 234 | 110 | 102 | 46 | 36 | 22 | 12 | 8 | 6 | 2 | 2 |
| Element | Si | K | Ca | P | Mg | Fe | S | Na | Mn | Ni | B | Ba | Zn |

As can be seen, the elemental content profile and predominant elements from the lignocellulosic filtrate are substantially different than those in algal filtrates, with silicon and calcium being among the four most concentrated.

The results from the composition of the aqueous solution from the process for the alga-derived product (Example 29), when compared with the filtrate obtained from the HTC of prairie grass substrate in the above Comparative Example 1, demonstrate the following:

1) The increased % solids of the alga filtrate compared to the lignocellulosic corroborates earlier literature reports that high levels of carbon efficiencies are maintained with the insoluble products from lignocellulosic materials. This is in contrast to algal species that provide significant quantities of the water soluble carbonaceous products.

2) The overall elemental composition of the solutions of hydrothermal carbonization solution filtrates with algal substrates are quite different than with a lignocellulosic substrate, e.g., Si and Ca are among the four most concentrated metals present in the aqueous product of the latter.

3) The high percentage of nitrogen, modest level of phosphorous, relatively low salt content and relatively neutral pH (especially compared to the highly acidic pH with the lignocellulosic in the Comparative Example) of algal-derived filtrates provide for excellent fertilizing solutions for plants.

Example 30

An experiment was performed to quantify and demonstrate the relatively reduced or minimal amount of gaseous products, e.g., less than 10%, that are generated when using the process of the invention. *Chlamydomonas reinhardtii* and conditions similar to those described in Example 24 above (203° C., 7.5% solids, 2 h) were employed to measure the carbon mass balance from reactant to reaction products.

Into a 450 mL reactor were charged 15.55 grams of freeze-dried *C. reinhardtii*, oxalic acid (0.35 g) and deionized water (192 grams). The mixture was then stirred at a rate of 60 rpm and heated to a temperature of 203° C. for a period of two hours. Final pressure was 240 psi and, when cooled to a temperature of about 22° C., the pressure was 65 psi.

The gas was released into a Tedlar gas collection bag and analyzed using a Prima δB Quadrupole Mass Spectrometer (available from Thermofisher, Vernon Hills, Ill.) using Gasworks Software (version 2.0). Carbon dioxide was the predominant gas, with some carbon monoxide also being detected. The following acquired data was utilized to compute the carbon mass balance for this reaction:

a) Freeze-dried algae weight=15.55 grams having a % C=51.9, providing 8.07 grams of carbon in the starting alga substrate.

b) Freeze-dried synthetic coal weight=6.15 grams having a % C=72.7, providing 4.47 grams of carbon or 55% of the starting carbon in the synthetic coal product.

c) The aqueous filtrate volume was 192 grams and had a % solids=3.94; the brown solid product weighing 7.56 grams had a % C=48.1, providing 3.64 grams of carbon in the aqueous filtrate.

The carbon dioxide (assuming all the gas was carbon dioxide) exhibited a pressure at 22° C. (295° K) of 65 psi+14.7 psi=79.7 psi (79.7 psi±14.7 psi/atm=5.42 atm) and occupied ca. 250 mL of headspace in the reactor. Applying the Universal Gas Law (rearranged to compute the number of moles of carbon dioxide) with the appropriate constant (R=82.05):

Number of moles = pressure × volume ÷ $R$ × Temperature(295° K) =

(5.42)(250) ÷ (82.05)(295) =

0.056 mole of carbon dioxide having a molecular weight of 44 g/mole and % C = 27.3 which computes to 0.67 gram of carbon in the carbon in the headspace.

The carbon dioxide dissolved in the 192 grams of water at 22° C. (solubility of carbon dioxide in water at 22° C.=0.16 gram/100 grams) weighed 0.31 gram and a % C=27.3 or 0.08 gram of carbon dissolved in the water.

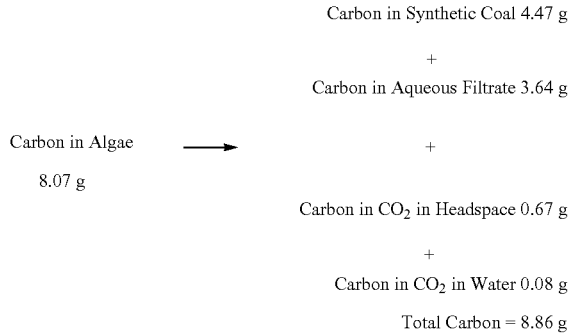

An overall mass balance of 110% was calculated—an acceptable calculation given the relative error with each of the measurements. Again, assuming all of the gaseous products were carbon dioxide, the level of that product was less than 10% of the total products. Thus, the results demonstrate that the hydrothermal carbonization process of the invention increases the carbon-to-oxygen ratio of the algal substrate primarily by dehydration and not by splitting-off carbon dioxide as an amount of gaseous products less than about 10% (assuming all the gas is carbon dioxide) when using Chlamydomonas starting material. This is less than the amount of gaseous by-product that would have been generated using higher temperatures and reaction pressures described by others in the field and designed to increase carbon-to-oxygen ratios primarily by loss of carbon dioxide.

INDUSTRIAL APPLICABILITY

The product and process of the invention are useful in the preparation of environmentally advantageous and energy efficient synthetic coal derived from natural biological sources. In addition to the use of the algae-derived synthetic coal products being used in heat energy applications, the product can also have usage in a variety of other applications. Examples of such applications include production of syngas via gasification, carbon dioxide sequestration, storing synthetic coal in isolated e.g. subterranean locations thereby "fossilizing" the carbon or allowing the coal to oxidize slowly, using as a soil or concrete additive. Furthermore, the filtrate (a useful by-product) from the process of the invention can also be utilized as or in preparation of industrial chemicals, fertilizers and/or fermentation media nutrients due to the presence of nitrogen-containing solutes, fatty acids from lipids and amino acids from proteins.

The invention herein above has been described with reference to various and specific embodiments and techniques. It will be understood by one of ordinary skill in the art, however, that reasonable variations and modifications may be made with respect to such embodiments and techniques without substantial departure from either the spirit or scope of the invention defined by the following claims.

What is claimed is:

1. A process for preparing an algae-derived synthetic coal product, said process comprising the steps of: a) providing a starting alga material comprising a mixture of water and of single cellular algae, b) subjecting said starting alga material in a sealed system to hydrothermal carbonization process to produce the algae-derived synthetic coal product wherein essentially no water in the form of vapor or a liquid is lost from the system during the hydrothermal carbonization process and wherein time, pressure and temperature variables of the hydrothermal carbonization process are selected so that any production of carbon dioxide gas produced as a result of the loss of carbon from the stating alga material is minimized; c) filtering the resulting algae-derived synthetic coal product from the water to separate them into said algae-derived coal product and an aqueous filtrate; and d) separately collecting the algae-derived synthetic coal product and the filtrate.

2. The process according to claim 1, wherein said starting alga material comprises eukaryotic microalgae, prokaryotic cyanobacteria, or combinations thereof.

3. The process according to claim 1, wherein the starting alga material comprises a) eukaryotic microalgae selected from *Scenedesmus, Chlamydomonas, Dunaliella, Chlorella,* and *Nannochloropsis*, b) prokaryotic cyanobacteria selected from *Aphanizomenon, Spirulina, Synechocystis,* and *Synechococcus*, or c) combinations thereof.

4. The process according to claim 1, wherein the concentration of algae in the aqueous composition ranges from between about 2% to about 40% on a weight basis.

5. The process according to claim 1, further comprising the step of adding a acidic buffer or catalyst to the aqueous composition prior to the hydrothermal carbonization step.

6. The process according to claim 1, wherein the hydrothermal carbonization step is performed using a temperature ranging from between about 170° C. and about 225° C., for a duration ranging from about 0.5 hour to about 6 hours, and a pressure ranging up to about 350 psi.

7. The process according to claim 1 and further including the step of using the filtrate as a source of potassium, phosphorous or nitrogen.

8. The process according to claim 1 and further including the step of reusing the filtrate for mixing with single cellular algae for use in a subsequent hydrothermal carbonization processing thereof for achieving increased carbon yields in the separately collected algae-derived synthetic coal product.

9. The process according to claim 1, and where loss of carbon from the starting alga material is less ha 10% by weight.

10. The process according to claim 1, and where the loss of carbon from the starting alga material is less that 10% by weight.

* * * * *